(12) United States Patent
Mehmedagic

(10) Patent No.: US 12,489,538 B2
(45) Date of Patent: *Dec. 2, 2025

(54) TSN OPERATION MANAGEMENT SYSTEM WITH TIME CAPTURE LOCATION PROTOCOL

(71) Applicant: Schneider Electric USA, Inc., Andover, MA (US)

(72) Inventor: Alen Mehmedagic, Wilmington, MA (US)

(73) Assignee: Schneider Electric USA, Inc., Boston, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/583,800

(22) Filed: Feb. 21, 2024

(65) Prior Publication Data

US 2024/0195519 A1 Jun. 13, 2024

Related U.S. Application Data

(63) Continuation of application No. 17/517,339, filed on Nov. 2, 2021, now Pat. No. 11,916,660.

(60) Provisional application No. 63/109,278, filed on Nov. 3, 2020.

(51) Int. Cl.
H04J 3/06 (2006.01)
H04L 41/0654 (2022.01)

(52) U.S. Cl.
CPC ........ *H04J 3/0661* (2013.01); *H04L 41/0654* (2013.01)

(58) Field of Classification Search
None
See application file for complete search history.

(56) References Cited

U.S. PATENT DOCUMENTS

| | | | |
|---|---|---|---|
| 10,764,180 B1 | 9/2020 | Klein | |
| 2006/0251256 A1 | 11/2006 | Asokan et al. | |
| 2014/0056143 A1* | 2/2014 | Hedlund | H04L 43/16 370/235 |
| 2022/0006548 A1* | 1/2022 | Xu | H04J 3/0682 |

OTHER PUBLICATIONS

PCT Search Report and Written Opinion for PCT Application No. PCT/US2021/057752 dated Feb. 3, 2022.

\* cited by examiner

*Primary Examiner* — Anh Ngoc M Nguyen
(74) *Attorney, Agent, or Firm* — Quinn IP Law

(57) ABSTRACT

Embodiments of the present disclosure relate to systems and methods for monitoring and verifying latency on TSN-configured networks. The disclosure describes a novel and inventive time capture location protocol that supplements existing TSN protocols. This supplemental TSN protocol details a way to capture the time at which a message arrives at various points in a TSN-configured network. The captured times allow for monitoring and verification of TSN based features and their underlying systems, including run-time diagnostics to detect problems and delays.

20 Claims, 13 Drawing Sheets

TSN OPERATION MANAGEMENT SYSTEM WITH TIME CAPTURE LOCATION PROTOCOL

CROSS-REFERENCE TO RELATED APPLICATIONS

This application for patent is a continuation of U.S. Nonprovisional application Ser. No. 17/517,339, entitled "TSN Operation Management System with Time Capture Location Protocol," filed Nov. 2, 2021, which claims the benefit of priority to U.S. Provisional Application No. 63/109,278, entitled "TSN Operation Management System with Time Capture Location Protocol," filed Nov. 3, 2020, the foregoing applications being incorporated herein by reference in their entirety.

TECHNICAL FIELD

Embodiments disclosed herein relate generally to the use of time-sensitive networking (TSN) in data communication networks and, more particularly, to systems and methods for monitoring and verifying message transit time in such TSN networks.

BACKGROUND

A data communication network, or simply "network" herein, enables data communication between, for example, different computers, computers and peripherals, and other data devices. Different industrial domains have different requirements for data communication. For example, in food processing plants, many automated processes have strict timing requirements that need to be tightly controlled and monitored for safety and other reasons. Consider a high-speed cheese slicing system where an automated knife blade slices through a block of Swiss cheese being advanced by a motor-driven cheese block feeder. The speed at which the cheese block needs to advance is determined by a scanning system that analyzes the holes in the cheese block. In order for the cheese slicing system to produce cheese slices of approximately the same weight, the motion of the knife blade must be synchronized with the advancement of the cheese block. Even a small delay in either processing the data or communicating the data over the network can result in cheese slices of non-uniform weights, causing wastage and loss productivity. Similarly, in the automotive industry, safety critical applications that control safety features (e.g., auto braking) and autonomous driving also have strict timing requirements for data communication. Any unaccounted-for delay in the system can have severe safety implications.

In the above domains and many other domains, there is a desire to use Ethernet technology for the network backbone. Among other things, an Ethernet backbone can support Internet of Things (IoT)/Industrial Internet of Things (IIoT) connectivity to provide remote monitoring and management, centralized analytics, and other features and functionality. The Ethernet standard, however, cannot ensure that critical, real-time data will be delivered across a network from device A to device B within the required time, which is a key requirement for many time-critical applications. This is because Ethernet and similar network standards focus on delivering data reliably more than on timing. For time-critical applications, time-sensitive networking (TSN) as specified by IEEE 802.1 can provide fully deterministic, real-time delivery of network messages over standard Ethernet networks. TSN makes it possible to send deterministic communication over Ethernet networks, thereby satisfying the real-time data delivery requirements of many time-sensitive applications. However, current implementations of TSN do not have a way to monitor and verify the timing of network messages to ensure that latency is being tightly controlled as intended.

Therefore, a need exists for a way to monitor and verify message timing in networks that use TSN.

SUMMARY

Embodiments of the present disclosure relate to systems and methods for monitoring and verifying latency on TSN-configured networks. The disclosure describes techniques and implementations related to a novel and inventive time capture location protocol that supplements existing TSN protocols. This supplemental TSN protocol details a way to capture the time at which a message arrives at various points in a TSN-configured network. The captured times allow for monitoring and verification of TSN based features and their underlying systems, including run-time diagnostics to detect problems and delays.

In general, in one aspect, embodiments of the present disclosure relate to a network configured for TSN. The network comprises, among other things, an end station operable to transmit and receive TSN messages on the network and a network infrastructure device connected to the end station and operable to send and receive TSN messages to and from the end station, respectively. The network further comprises a Centralized User Configurator (CUC) connected to the end station and operable to configure the end station for TSN, the CUC further operable to instruct the end station to initiate time data capture. The end station is further operable to generate, in response to being instructed by the CUC to initiate time data capture, a predetermined number of frames at a preselected interconnection layer and transmit the frames to the CUC, the end station inserting current network time data in each frame. The CUC is further operable to determine how much transmission jitter and/or latency is present using the current network time data in the frames.

In general, in one aspect, embodiments of the present disclosure relate to a method of operating a network configured for TSN. The method comprises, among other things, generating, at a talker device, a frame with an initial timestamp at a preselected Open Systems Interconnection (OSI) layer, the initial timestamp reflecting then-current network time. The method further comprises collecting additional timestamps as the frame traverses the OSI layers towards a network port of the talker device, each additional timestamp reflecting then-current network time. The method still further comprises transmitting the frame across the network via at least one infrastructure device, wherein at each preconfigured infrastructure device, the frame is timestamped at an ingress and an egress of the preconfigured infrastructure device. The method yet further comprises receiving the frame at a listener device, and collecting the at least one additional timestamp as the frame traverses the OSI layers of the listener device, the at least one timestamp taken at a preselected OSI layer of the listener device. The method still further comprises calculating, based on the collected timestamps, including the initial timestamp and the at least one timestamp, transmission jitter and/or latency in network traffic through the network.

In general, in one aspect, embodiments of the present disclosure relate to a network controller configured for TSN.

The network controller comprises a processor and a storage system connected to the processor, the storage system storing computer-readable instructions thereon. The computer-readable instructions, when executed by the processor, cause the network controller to instruct a network end station to initiate time data capture, the network end station generating, in response to being instructed by the network controller, a predetermined number of frames at a preselected interconnection layer and transmitting the frames to the network controller, the network end station inserting current network time data in each frame. The computer-readable instructions, when executed by the processor, further cause the network controller to determine an amount of transmission jitter and/or latency using the current network time data in the frames.

In general, in one aspect, embodiments of the present disclosure relate to a network device configured for TSN). The network device comprises, among other things, a processor and a storage system connected to the processor. The storage system stores computer-readable instructions thereon that, when executed by the processor, cause the network device to receive instruction from a network controller to initiate time data capture. The computer-readable instructions further cause the network device insert, in response to receiving instruction from the network controller, current network time data in a predetermined number of frames, and transmit the frames to the network controller to determine how much transmission jitter and/or latency is present using the current network time data in the frames.

In general, in one aspect, embodiments of the present disclosure relate to a network configured for TSN. The network comprises, among other things, an end station operable to transmit and receive TSN messages on the network, each TSN message having a frame therein. The network further comprises a network infrastructure device connected to the end station and operable to send and receive TSN messages to and from the end station, respectively, and a network test access point (TAP) device connected to, and operable to copy TSN messages from, the end station and/or the network infrastructure device. The network still further comprises a network controller connected to the end station, the network infrastructure, and the TAP device, the network controller operable to instruct the TAP device to initiate time data capture. The TAP device is further operable to insert, in response to being instructed by the network controller to initiate time data capture, current network time data in a predetermined number of frames and transmit the frames to the network controller. The network controller is further operable to determine how much transmission jitter and/or latency is present using the current network time data in the frames.

DETAILED DESCRIPTION OF DISCLOSED EMBODIMENTS

Figure 1:
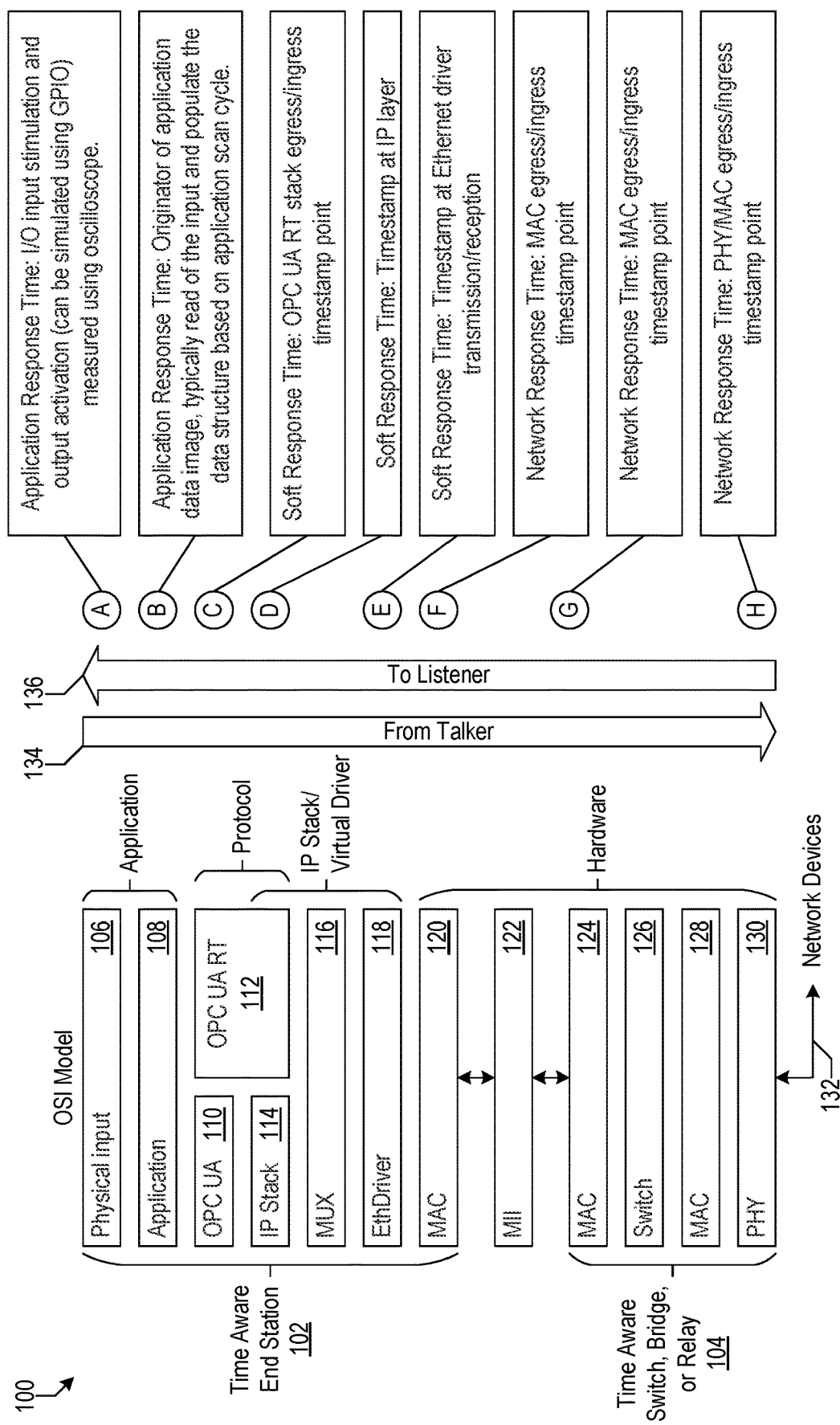
FIG. 1 illustrates exemplary time capture locations in a device in accordance with some embodiments of this disclosure.

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As alluded to above, existing TSN-configured networks do not have a way to monitor and verify latency of messages sent on the networks. The present disclosure provides systems and methods for monitoring and verifying latency on TSN-configured networks. The term "TSN" or "time-sensitive networking" or "time-sensitive network" refers to a set of protocols defined by IEEE 802.1 that specify the mechanisms for transmission of time-sensitive or time-critical data over an Ethernet network (or similar network). The disclosure describes techniques and implementations related to a novel and inventive time capture location protocol, referred to herein as "802D," that supplements the set of protocols defined by IEEE 802.1. This supplemental TSN protocol 802D details a way to capture the time at which a message is received at various points in a TSN-configured network. The captured times allow for monitoring and verification of TSN based features and their underlying systems, including run-time diagnostics to detect problems and delays.

A number of benefits arise from various embodiments that implement the time capture location protocol herein. These benefits include, for example, the ability to calculate and compare the configured latency of the network to the achieved/actual latency (e.g., various lengths of frames, different speed of links across the paths, cable lengths and types of copper fiber, etc.), as well as aiding in the identification of misconfigured or faulty devices in paths that have been provisioned through the network.

Additional benefits provided by these embodiments include the ability to dynamically adjust TAS (Time Aware Shapers) (802.1Qbv) gate sizes and offsets based on live traffic, thereby aiding in intelligent Centralized Network Configurator (CNC) (802.1Qcc) operation to maintain latency even when a misconfigured or faulty device is detected.

Further benefits include the ability to determine network, stack, and application layer contribution to overall latency so that each layer can be adjusted to optimal settings, ultimately leading to the alignment of all communication layers (i.e., intelligent self-adjusting TSN). The above benefits may also be extended to OPCUA (Open Platform Communications United Architecture), a commonly used industrial data exchange standard, by adding corresponding OPCUA network management objects.

Still further benefits include the ability to detect, on a per stream basis, network congestion and network configuration capacity as well as configuration collisions, determine if the path through the network is precise and accurate, measure the difference in latency in redundant streams, dynamically discover streams of similar latency to aid in path computation, combine TAS gates for streams with high precision and accuracy, and provide aggregated TAS tables for application synchronized streams. Enhanced intrusion detection and prevention can also be achieved through detection of unexpected delays between known infrastructure devices (e.g., ghost switches adding to point latency).

Time-Sensitive Networking (TSN)

Time-sensitive networking (TSN) generally refers to a set of technologies that enable fully deterministic real-time communication. TSN achieves deterministic real-time communication by using centralized control, time synchronization, and scheduling. In a TSN-configured network, messages or data packets are transmitted based on a time schedule and priority designation in order to guarantee a maximum bounded latency and reliability. As such, TSN technology can enable control applications, including but not limited to those in the industrial and automotive domains, to transmit time-critical data over a standard Ethernet infrastructure, thus obviating the need for specialized protocols to handle delivery of real-time data.

Standard Ethernet infrastructure generally adheres to conventional network architecture that includes (i) a Data Plane where the actual data forwarding occurs, (ii) a Control Plane where forwarding decisions are configured, (iii) and a Management Plane where device management decisions are configured. The infrastructure can be characterized based on the capabilities and purpose of the infrastructure devices. Examples of network infrastructure devices include (a) Edge Devices that produce and/or consume data, such as PLCs (programmable logic controller) and I/O devices, (b) Transport Devices that forward data through the network, such as bridges, relays, switches, and routers, and (c) Network Service Devices that perform data processing and filtering, such as deep packet inspection (DPI).

The data itself, particularly in the industrial domain or the automotive domain, can be generally characterized as (1) Time-Sensitive Data (TSD), (2) Time-Aware Data (TAD), and (3) Best-Effort Data (BED).

TSD type data requires delivery from producer to consumer reliably and instantly (i.e., end-to-end time awareness with 6-nines (99.9999%) reliability). Application response time (ART) for this type of data is typically less than 1 ms. TSD type data is associated with the following industry standards controlling and governing time-sensitive data: IEEE 802.1AS-rev, IEEE 802.1Qbv, IEEE 802.1Qbu, IEEE 802.1Qca, IEEE 802.1CB, IEEE 802.1Qcc, IEEE 802.1Qci, and IEEE 802.1Qch.

TAD type data is not time-sensitive, but does have deterministic qualities in that the data is constrained by timeout requirements. ART for this type of data is in the milliseconds range. BED type of data is considered non-essential information and thus can be translated to general network traffic with best-effort service level (QoS). TAD and BED type data are associated with IEEE 802.1Q and IEEE 802.1P.

Introduction to 802D

The 802D time capture location protocol, as discussed herein, is a TSN supplemental protocol that can capture the time at which a message travels through various points in the network for latency monitoring and verification purposes. This supplemental protocol can provide time tracking and diagnostic for each data frame (i.e., Ethernet frame) along the path through the TSN network. The supplemental protocol can also provide performance diagnostics for TSN features and accurate system wide benchmarking of real-time network traffic. The diagnostics include an accurate measurement of industrial application response time with an accurate per-frame impact of the network. This is possible or at least more feasible because of the way data frames travel through a network in most industrial applications, typically from point-to-point along a particular path, much like a daisy chain. Some of these paths can have a hundred or more points (e.g., switches) for the most demanding applications. The supplemental protocol disclosed herein can capture and collect the timing of the data frames along these paths.

From the collected frame timings, embodiments of the time capture location protocol can perform several actions, including calculating and comparing the configured latency of the network to the achieved latency, for example, to aid in the identification of misconfigured or faulty devices in the provisioned paths through the network. Latency may be a function of various lengths of frames, different speed of links across the paths, cable lengths and types of copper fiber, and the like. Embodiments implementing the time capture location protocol can also dynamically adjust TAS gate sizes and offsets based on live traffic, thereby aiding in intelligent CNC operation to maintain latency even when a misconfigured or faulty device is detected.

The collected frame timings also allows embodiments of the time capture location protocol to determine network, stack, and application layer contribution to overall latency so that each layer can be adjusted to optimal settings, ultimately leading to the alignment of all communication layers (i.e., intelligent self-adjusting TSN). These actions can also be extended to OPCUA as network management objects.

The foregoing embodiments provide a number of advantages, including detection of per-stream network congestion and network configuration capacity, as well as configuration collisions. Additional advantages include the ability to determine whether the path through the network is precise and accurate, measure the difference in latency in redundant streams, and dynamically discover streams of similar latency to aid in path computations. Further, TAS gates may be combined for streams with high precision and accuracy, and TAS tables may be aggregated for application synchronized streams. Other advantages include enhanced intrusion detection and prevention by detection of unexpected delays between known infrastructure devices (e.g., ghost switches adding to point latency).

For industrial applications in particular, embodiments that implement the time capture location protocol can benefit many areas, including application configuration, where dynamic configuration and immediate verification of application and stream performance are performed, as well as application commissioning, where testing of a configuration on a system level and potential certification of performance pre-production is performed. Other areas include production, where 802D provides a control protocol to ensure intended performance and allows dynamic addition, repositioning, decommissioning, and reconfiguration of network devices with immediate performance feedback.

Time Capture Locations

As touched upon earlier, embodiments of the time capture location protocol capture the current network time at various points traversed by a message through a TSN-configured network. The time capture can be done by obtaining a timestamp at various points along the paths provisioned in the network and adding the timestamp to the message. Each such point is referred to herein as a Time Capture Location (TCL). Each TCL can be referenced using the standard Open Systems Interconnection (OSI) model of a network. This model abstracts the flow of messages in a network into several layers, with the lowest layer being the physical medium across which the messages are transmitted, the highest layer being the devices/applications that send and receive the messages, and each intermediate layer serving the layer above it and being served by the layer below it. However, the OSI model is used herein for illustrative purposes only, and embodiments of the time capture location protocol are not limited to any particular model.

FIG. 1 shows an exemplary implementation of the 802D time capture location protocol disclosed herein with reference to a TSN-configured network, a portion of which can be seen at 100. There are mainly two types of devices on the TSN-configured network 100: end stations 102, and switches, bridges, and relays 104. The TSN end stations 102 can generally be categorized as talkers or listeners, or both, depending on whether they are sending or receiving messages, respectively, while TSN switches, bridges, and relays 104 operate to route the messages along the network. Non-limiting examples of end stations 102 include sensors, metering devices, pressure switches, level switches, actuators, motors, relays, solenoids, various analog devices, and other devices that can run applications requiring time-critical deterministic communications and functions. Hybrid devices are also contemplated that have the functionality of both an end station and a switch, bridge, or relay. These TSN end stations 102 and switches, bridges, and relays 104 are considered to be "time-aware" in the sense that they belong to same time domain, as governed by a gPTP master clock. The devices also manage time slots or any time related function based on the time of that domain.

As can be seen in FIG. 1, the end stations 102 and the switches, bridges, and relays 104 are defined based on various layers of the OSI model. For example, each end station 102 can include a physical input layer 106 (e.g., raw sensor readings) and an application layer 108 that processes the physical input 106 (e.g., converts sensor readings to temperatures). The physical input layer 106 and the application layer 108 together constitute the application, such as a temperature sensor, running on the end station 102. Each end station 102 further includes of an OPCUA stack composed of an OPCUA client 110 and an OPCUA real-time layer 112. The OPCUA client 110 and the OPCUA real-time layer 112 establish the communication protocol followed by the end station 102. Note that the use of OPCUA herein is illustrative only and those having ordinary skill in the art will understand that other industrial communication protocols may be used within the scope of the disclosed embodiments.

The OPCUA stack 110, 112 resides on a TCP/IP stack 114 in each TSN end station 102. Each TSN end station 102 further includes a multiplexer 116 that provides access to or otherwise interfaces with an Ethernet driver 118. The TCP/IP stack 114, the multiplexer 116, and the Ethernet driver 118 provide the IP stack/virtual driver for the end station 102. A MAC (media access control) layer 120 of the end station 102 connects the end station 102 to a standard MII (media independent interface) 122. The MAC layer 120 corresponds to the data link layer (Layer 2 or L2) of the OSI model.

The MII 122 in turn connects the end station 102 to a switch MAC 124, also called an integrated MAC or management MAC. The switch MAC 124 is associated with and provides access to a packet switch 126 in the switch, bridge, or relay 104. The TSN switch, bridge, or relay 104, like the end station 102, also has a MAC 128 and a PHY (physical medium) interface 130 that connects the switch, bridge, or relay 104 to other network devices via an Ethernet port over a physical medium 132 (e.g., Ethernet cable). The end station MAC 120, the MII 122, the switch MAC 124, the packet switch 126, the link layer MAC 128, and the PHY interface 130 are usually hardware components.

The OSI layers above are not the only OSI layers, but are the most relevant for the purposes herein. Operation of the end station 102 and the switch, bridge, or relay 104 is well known to those having ordinary skill in the art and therefore a detailed description is omitted here for economy. In general, when the end station 102 is operating as a talker, messages travel to the switch, bridge, or relay 104 and out into the rest of the network 100 in the direction indicated by the talker transit arrow 134. When the end station 134 is operating as a listener, messages travel from the rest of the network 100 to the switch, bridge, or relay 104 and subsequently to the end station 102 in the direction indicated by the listener transit arrow 136.

In accordance with embodiments of the present disclosure, the current network time may be captured at various locations as each message travels along the talker transit arrow 134 or the listener transit arrow 136. Each time capture location or TCL corresponds to one of the layers 106 through 130 of the various OSI layers. Exemplary TCLs are labeled A through F for the end station 102 and labeled G and H for the switch, bridge, or relay 104. A timestamp of the current network time may be obtained and added to the message at any one or more of these TCLs to monitor latency and verify the accuracy of the network time. Additional and/or alternative TCLs are available within the scope of the disclosed embodiments.

In the FIG. 1 example, TCLs A and B correspond to the physical input layer 106 and the application layer 108, respectively. The time that it takes a message to traverse from TCL A on one end station 102 operating as a talker to TCL A (or a different TCL) on another end station 102 operating as listener (and vice versa) depends on the application response time (ART) and includes, for example, I/O input stimulation and output activation time (which can be simulated using a general-purpose input/output (GPIO) or period using an oscilloscope). The time that it takes a message to traverse from TCL B on one end station 102 operating as a talker to TCL B (or a different TCL) on another end station 102 operating as listener (and vice versa) is largely driven by the originator of the application data image and typically includes the time to read the I/O input, then populate the data structure (e.g., temperature reading) based on application scan cycle.

TCLs C and D correspond to the OPCUA stack 110, 112 and the TCP/IP stack 114, respectively. The time that it takes a message to traverse from TCL C on one end station 102 to TCL C (or a different TCL) on another end station 102 (and vice versa) is a soft response time (SRT) that reflects how long it takes for a message to exit (egress) and enter (ingress) the respective OPCUA stacks 110, 112. Similarly, the time that it takes a message to traverse from TCL D on one end station 102 to TCL D (or a different TCL) on another end station 102 (and vice versa) is a soft response time that reflects how long it takes for a message to exit (egress) and enter (ingress) the TCP/IP respective stacks 114.

TCL E corresponds to the MUX 116 and/or Ethernet driver 118. The message transit time from this TCL to the same TCL (or a different TCL) in another end station 102 (and vice versa) is again a soft response time that reflects the time it take for a message to exit and enter the MUXs 116 and/or Ethernet driver 118. TCL F corresponds to the end station MAC 120, which is the layer (i.e., Layer 2) through which the message is transmitted or received by the end station 102. The message transit time from the end station MAC 120 to another end station MAC 120 (and vice versa) is a network response time (NRT) that reflects how long it takes for a message to exit and enter the respective layers.

TCLs G and H correspond to the switch MAC 124 and the link layer MAC 128/PHY interface 130, respectively. The message transit time from each of these TCLs to the same TCL (or a different TCL) on another switch, bridge, or relay 104 is also a network response time (NRT) that reflects how long it takes for a message to exit and enter each respective TCL. These TCLs G and H are also the points where the message enters and exits, respectively, the switch, bridge, or relay 104.

Note that for a given message, each switch, bridge, or relay 104 traversed by the message presents a separate set of TCLs G and H for the message, such that the message may accumulate multiple (possibly hundreds) TCL G and H timestamps as it travels through the network 100. However, since the time stamping herein is a configurable feature on the various devices, including the switches, bridges, and relays, for economy, it is not necessary to perform the time stamping on every switch, bridge, or relay between the talker and the listener in the network if network time is not the suspected cause of the latency related failures. In other words, it is not necessary to perform the time stamping on every switch, bridge, or relay if the latency is suspected to be mainly a contribution of the end station device itself and its internal implementation.

Additionally, as alluded to above, the travel time between a talker TCL A and a listener TCL A is a single direction application response time. The travel time between TCL C and TCLs D and E defines the traversal time through the OPCUA/OPCUA real time stack 110/112. Each of these time intervals can be used to qualify the application and identify detailed points of contribution to the overall latency of the communication stream. However, while the time intervals provided in FIG. 1 can be used to measure the performance of the TSN devices, they are exemplary only. As more components and layers are inserted along the path, the number of TCLs can be extended and a new meaning can be assigned to the time intervals. For example, if there is encryption anywhere along the path and it can be time-stamped, an interval can be defined and associated with the encryption and the encryption processing contribution can be assigned to the interval. The purpose of dividing the network latency into intervals is to ease diagnostic of time contribution along the path.

Time Capture Operation

Figure 2:
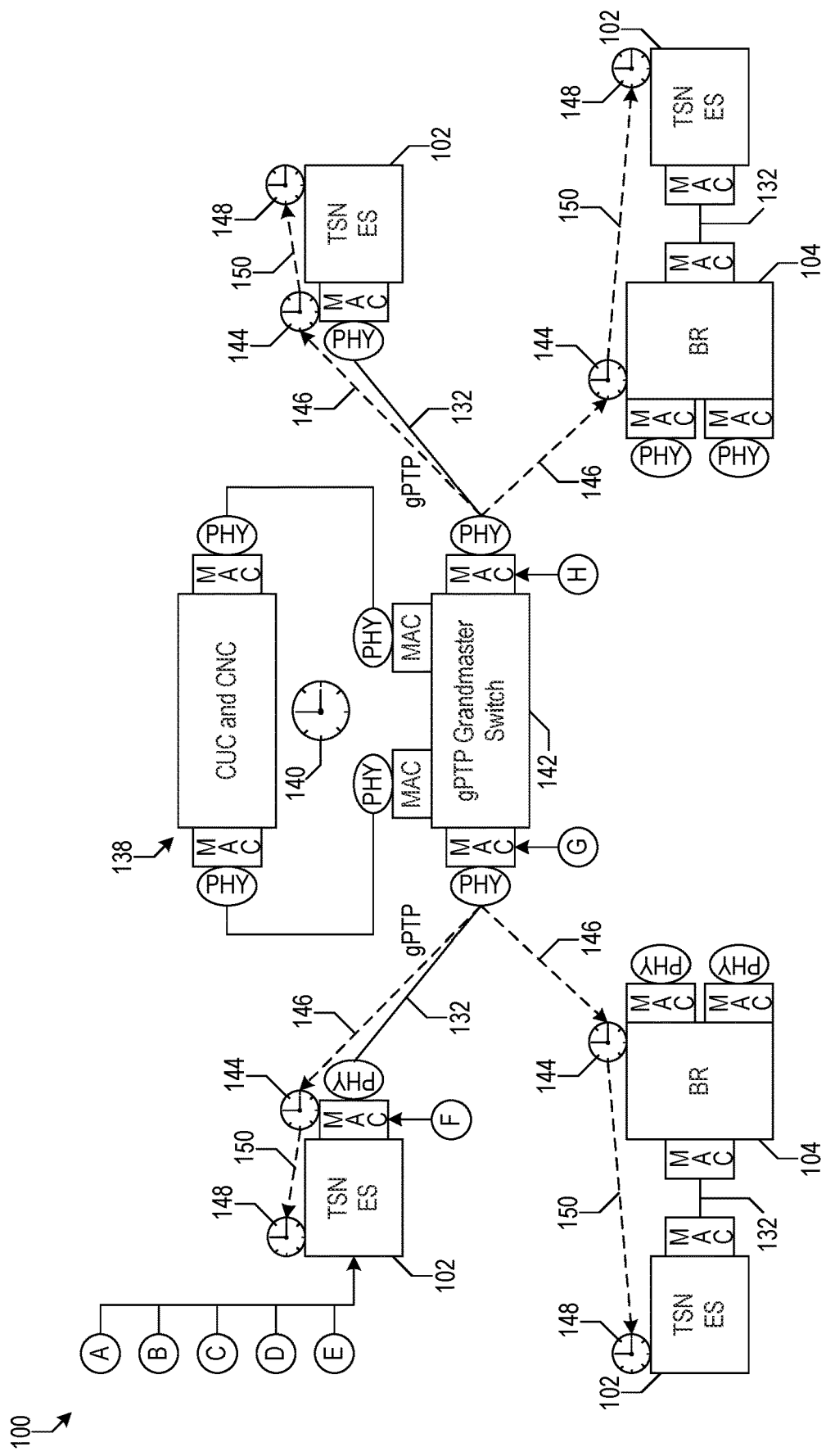
FIG. 2 illustrates exemplary time capture locations in a network in accordance with some embodiments of this disclosure.

Turning now to FIG. 2, a fuller view of the TSN-configured network 100 from FIG. 1 is shown having an exemplary implementation of the 802D time capture location protocol thereon. As can be seen, the network 100 includes several TSN end stations 102 (TSN ES) and TSN bridges (BR) 104, each of which has a respective MAC layer and PHY interface that are not specifically numbered for avoidance of clutter. Those having ordinary skill in the art will understand that a MII may also be provided in place of a PHY interface between some of the TSN end stations 102 and bridges 104. TCLs A through H correspond to the same TCLs A through H described with respect to FIG. 1.

A network control application 138, which may be a Centralized User Configurator (CUC) and a Centralized Network Controller (CNC) in some embodiments, is also present in the network 100. The CUC and CNC 138 may be discrete elements in the network 100, or they may be distributed throughout the network 100, with a master residing in a central location, including in a cloud environment, for example. In general, the CUC and CNC 138 provide the network connection and configuration parameters required to provision a TSN stream in the various bridges 104 (and other infrastructure devices). Based on the connectivity requested by the TSN end stations 102 (e.g., via the OPCUA client 110 therein), the CUC and CNC 138 determine the required network connection and configuration parameters and provide these parameters to the bridges 104 (and other infrastructure devices). Note that some aspects of the CUC can be implemented as part of the industrial application, in which case the end stations 102 will not request connectivity from the CUC, but rather will be told by the CUC how to configure its communication parameters.

To maintain time-awareness, the various end stations 102 and bridges 104 in the network 100 are synchronized to a grandmaster clock 140 that establishes the current network time for the network 100. The grandmaster clock 140 can be implemented as part of the CUC and CNC 138 in some embodiments, it can be implemented one hop away from the CUC and CNC 138 in some embodiments, or it can be implemented in some other suitable arrangement. Time synchronization within the network 100 follows the generalized Precision Time Protocol (gPTP) specified by IEEE 802.1AS in some embodiments, although other suitable and precise time synchronization protocols (i.e., time sync protocols) may be used within the scope of the embodiments herein (e.g., IEEE 1588). The use of gPTP allows the various end stations 102 and bridges 104 (and other infrastructure devices) in the network 100 to be synchronized to the grandmaster clock 140 to a high degree of precision, typically within 10 ns.

The synchronization occurs in some embodiments via a gPTP grandmaster switch 142 that relays the current network time from the grandmaster clock 140 to the various end stations 102 and bridges 104 (and other network devices). A network clock 144 at each end station 102 and at each bridge 104 receives time synchronization messages containing timestamps (reflecting the current time) on a regular basis from the grandmaster switch 142. The time synchronization messages are received via a direct network link 146 to the grandmaster switch 142. Each network clock 144 updates itself after accounting for message transit time, and provides the timestamps to a local CPU clock 148 at each end station 102 over a local (internal) link 150. In general, synchronization operates as specified in IEEE 802.1AS. The switch 142 may also be a grandmaster clock, which may be implemented as a CUC, a CNC, or even an end station, that generates the clock signal. Then other switches 104 can then serve as relays to which the end stations 102 can be slaved for the clock signal.

The TSN-configured network 100 as described above is amenable to at least two methods of capturing network time and measuring latency according to embodiments of the present disclosure. The first method uses direct capture where a timestamp is obtained and appended to a message at various preselected TCLs as the message traverses the TCLs. The second method uses a centralized measurement approach wherein latency is derived from existing time information received at the CUC and CNC 138 from the end stations 102. Following is a description of these methods from the perspective of an end station 102 as a talker connected to a bridge 104 and/or other network infrastructure device (e.g., switch), and further connected to one or more end stations 102 as listeners.

Direct Time Capture

Direct capture embodiments are based on a client-server or talker-listener messaging model in which the end stations 102 operating as client/talker devices generate messages at the various OSI layers. In accordance with the 802D time capture location protocol, the client/talker end stations 102 (i.e., end station 102 operating as a client/talker) insert timestamps into a frame at a certain OSI layer preconfigured or preselected as a TCL on the way toward the device Ethernet port. Such frames are referred to herein as 802D frames and the timestamps can be inserted at TCL F (i.e., Layer 2 (L2)), or data link layer, of the OSI model) in some embodiments. At the bridges 104 (or other infrastructure devices), the timestamps can be inserted into the 802D frames at the ingress (TCL G) and/or egress (TCL H) ports. Server/listener end stations 102 can also insert timestamps into the 802D frames, preferably at TCL F (Layer 2), or when the messages are received by the final OSI layer at which processing is performed. These timestamps reflect the then-current network time at each TCL to a highly accurate degree, even at 1 Gbps link speeds. This is because all devices in the TSN domain are synchronized to the grandmaster clock 140 using gPTP, which has an error of less than 1 µs under nominal operating circumstances. Errors greater than 1 µs can be corrected using the control sub-messaging of the 802D time capture location protocol to communicate a gPTP offset to the CUC and CNC 138, as needed.

It should be noted that the discussion herein describes insertion of timestamps into frames generally for illustrative purposes, and those having ordinary skill in the art will appreciate that embodiments of the present disclosure are not so limited. As discussed above, embodiments herein contemplate timestamps being inserted not only at Layer 2, but also at any one or several other TCLs corresponding to multiple OSI layers, depending the particular implementation. In general, timestamps can be obtained and inserted into any unit of network communication, such as a packet, which can then be combined into larger units or divided smaller units as needed. Thus, timestamps can be obtained and inserted at the physical layer (i.e., Layer 1 (L1)), at the network layer (Layer 3 (L3)), or any of the other OSI layers, depending on the particular implementation.

In general operation, a client/talker end station 102 generates a message having an 802D frame and inserts an initial timestamp into the frame at a certain OSI layer that is preconfigured or preselected as a TCL. The timestamp may be obtained at or close to Layer 2 (L2) of the OSI model, such as where there is usually a raw no-copy socket layer, or at the Ethernet device driver. The timestamp may also be obtained at the virtualization layers (e.g., containers, hypervisors), at the UDP datagram sockets, or at the TCP datagram sockets. The timestamp may alternatively be obtained at the OSI application layer, or at an industrial protocol layer. An example of a suitable industrial protocol is OPCUA, which can handle data definitions through careful description of data that can be modified in transit.

The client/talker end station 102 then transmits the message with the 802D frame across the TSN-configured network 100 via the various bridges 104. At each 802D participating bridge 104, a timestamp is obtained at the ingress and/or egress of the bridge and the timestamps are then inserted or appended to the 802D frame of the message. Then, at a server/listener end station 102 (i.e., end station 102 operating as a server/listener), a final timestamp is taken as close as possible to the OSI layer that is the final processing layer (i.e., application layer) and inserted into the 802D frame. The 802D frame now contains timestamps from each OSI layer preconfigured or preselected as a TCL through which the message traveled, and calculations of gPTP offset, jitter, and latency can be performed. These calculations can be performed at the server/listener end station 102 in some embodiments, and a summary of the calculations can be sent to the CUC and CNC 138. In other embodiments, the raw timestamp data can be sent to the CUC and CNC 138 for computation thereby. The latter embodiments are particularly advantageous where there are multiple server/listener end stations 102 that receive the 802D frames, as the CUC and CNC 138 can correlate timestamps among the various server/listener end stations.

Non-limiting examples of computations that may be performed, either at a server/listener end station 102 or at the CUC and CNC 138, include transmission jitter at a client/client/talker end station 102, latency across each bridge 104 (or other infrastructure device), latency across a segment of the network, reception jitter at a server/server/listener end station 102, gPTP offset time from reception of each server/listener in a multi-server/listener scenario, and multi-stream jitter.

In some embodiments, implementation of protocols such as IEEE 802.1CB on the network 100 may lead to replication of the 802D frames. The IEEE 802.1CB standard applies to local and metropolitan area networks and establishes rules for frame replication and elimination for reliability. Protocols like IEEE 802.1CB can be augmented to identify which TSN streams are redundant for further use in overall latency diagnostic.

Centralized Time Capture

The centralized time capture method is based on a similar principle as the direct time capture method described above, except that the 802D frames are not altered to append a timestamp. Instead, the client/talker end station 102 and the bridges 104 communicate the time information (e.g., timestamps) to the CUC and CNC 138 using dedicated 802D messages that contain the time information. The CUC and CNC 138 then uses the time information in the dedicated 802D messages to perform the gPTP offset, jitter, and latency calculations. The centralized approach has two main modes of operation: 802D message mode, and 802D attached mode.

In the 802D message mode, the client/talker end station 102 generates a message in the same manner as in the direct mode and transmits the message across the TSN-configured network 100 via the various bridges 104. However, the bridges 104 and other infrastructure devices do not alter the 802D frame in the message by inserting a timestamp. Instead, the client/talker end station 102 sends a separate message with the timestamped 802D frame directly to the CUC and CNC 138. The CUC and CNC 138 collects these messages with the timestamped 802D frames from the client/talker end station 102 and reconstructs the TSN control stream upon reception of the final timestamp from a sever/listener end station 102.

In the 802D attached mode, pattern recognition is used to match or recognize a pattern within a portion of a frame where timestamp information is expected to be inserted. As discussed further below, the frame can be preconfigured to hold pattern information (e.g., 5555) at a certain place, such as a particular block or a particular offset, which may be repeated, within the frame. A bit pattern matcher or similar masking mechanism can then be used to identify or locate the blocks or offsets where the time information is expected to be inserted. In this mode, the client/talker end stations 102, the bridges 104 (and other infrastructure devices), and the server/listener end stations 102 time stamp their respective messages as above, then insert the timestamp into the frame and/or send the timestamp information to the CUC and CNC 138. The CUC and CNC 138 may then use same pattern template to locate the received timestamp information and reconstruct entire time information flow.

In both direct and centralized methods, collected data is used by CUC and CNC 138 to compare expected, calculated configuration-based latencies, with actual achieved latencies. From this comparison, the CUC and CNC 138 can derive certain diagnostic information and provide the diagnostic information to end users. The CUC and CNC 138 can also use the diagnostic information to automatically correct the network configuration based on preconfigured CNC options. The ability to automatically correct TSN configuration to meet user specification leads inexorably to realization of fully automated independent network subsystem, which can be considered an instance of intelligent networking.

802D Frame Format

Figure 3:
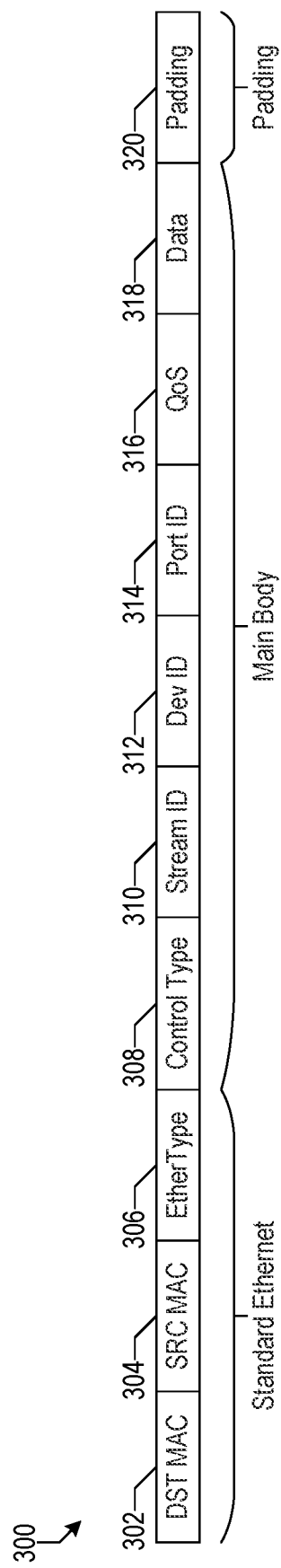
FIG. 3 illustrates an exemplary message frame format in accordance with some embodiments of this disclosure.

Turning next to FIG. 3, an exemplary 802D frame 300 is shown that may be contained within a message sent on the TSN-configured network 100 according to embodiments of the present disclosure. The 802D frame 300 is a Layer 2 (L2) frame that generally follows the standard Ethernet frame format used in TSN-configured networks, except the main body of the frame has been modified to include timestamp data according to embodiments herein. As can be seen, the frame 300 is composed of several standard Ethernet fields, including a destination MAC address field 302, a source MAC address field 304, and an EtherType 306. In addition, the frame 300 contains several fields that are specific to the TSN-configured network 100 and the 802D protocol disclosed herein, including a Control Type field 308, a Stream ID field 310, a Device ID field 312, a Port ID field 314, a Quality of Service (QOS) field 316, and a Data field 318. A padding section 320 may be used to pad the frame 300 with dummy data as needed to conform the frame 300 to the required size. Those having ordinary skill in the art will understand that the ordering of the fields that are specific to TSN-configured networks may be arranged differently from the ordering shown in FIG. 3 within the scope of the disclosed embodiments.

The destination MAC address field 302 and the source MAC address field 304 are standard fields that contain the destination MAC address, respectively. The EtherType field 306 is another standard Ethernet field that is used to indicate which protocol is encapsulated in the main body of the frame. This field 306 is also used by the message receiver to determine how the frame payload is processed. For 802D frames, the EtherType field 306 can be filled with type 0x802D to identify the 802D time capture location protocol. Likewise, at the OSI transport layer (L4), the UDP port and the TCP port for the frame 300 can be specified as 0x802D, which is 32813 in decimal format. The multicast address associated with the frame 300 is 224.8.0.213, for example, or another address that can be reserved by the Internet Assigned Numbers Authority (IANA). An alternative ad-hoc block address resembling 0x802D (e.g., 233.252.80.213) could be used instead for the multicast address.

The Control Type field 308 identifies the particular sub-protocol within the 0x802D, which specifies the type and content of the data in the data field 318. Exemplary Control Types for the Control Type field 308 are shown in Table 1 below along with the corresponding data in the data field 318 where L2, L3, and L4 are layers of the OSI model. Note in Table 1 that Control Types 2, 3, 4, and 5 may be combined into a single Control Type, depending on the implementation.

TABLE 1

802D Frame Control Types

| Control Type | Data |
| --- | --- |
| 1 | gPTP offset from grandmaster clock |
| 2 | Direct timestamp (via L2 message) |
| 3 | Direct time summary information (via L2 message) |
| 4 | Message mode centralized timestamp (via L3 message) |
| 5 | Attached mode centralized timestamp (via L4 message) |
| 0xff | Error code (see Table 2) |

The Stream ID field 310 is a field for messages in the TSN-configured network 100 herein that contains a unique identifier for the control stream, since multiple instances of clients and servers can operate at the same time in a single network. The Device ID field 312 is a field that contains a unique identifier for the originating device (e.g., client/talker end station). The Port ID field 314 is a field that contains a unique identifier for the originating port of the message. The QoS field 316 contains a number indicating which queue mapping (e.g., Queue 0-7) should be used for transmission of the message. This field may reflect a combination of a Differentiated Services Code Point (DSCP), VLAN identifier, VLAN Priority Code Point (PCP), and transmission quality of service (QOS).

Figure 4:
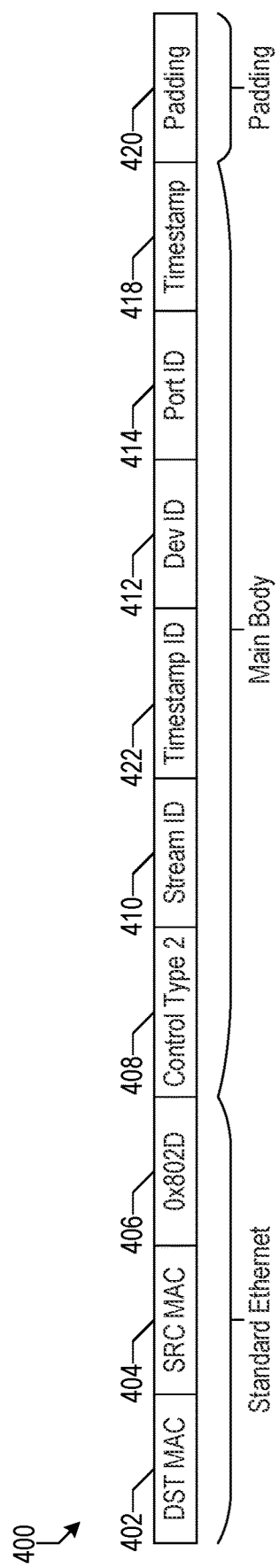
FIG. 4 illustrates another exemplary message frame format in accordance with some embodiments of this disclosure.

FIG. 4 illustrates a specific example of the 802D frame from FIG. 3, indicated at 400. Like its counterpart, the frame 400 is an L2 frame that generally follows the standard Ethernet frame format used in TSN-configured networks. Thus, there is a destination MAC address field 402, a source MAC address field 404, and an EtherType 406. There is also a Control Type field 408, a stream ID field 410, a device field ID 412, a port ID field 414, and a data field 418. The Control Type field 408 in this example contains Control Type 2 for a direct mode timestamp (see Table 1), and therefore the data field 418 contains a timestamp. In addition, the quality of service (QOS) field from FIG. 3 has been replaced with a Timestamp ID field 422 that contains an identifier for the timestamp in the data field 418. The Timestamp ID is a value generated by the client/talker end stations 102 and the bridges 104 in connection with each timestamp obtained, and may start at Timestamp ID=0. A padding section 420 may be used to pad the frame 400 with dummy data as needed to conform the frame 400 to the required size.

Following is a more detailed description of the Control Type 2 direct mode of capturing timestamps with respect to client/talker end stations 102, bridges and other infrastructure devices 104, server/listener end stations 102, and the CUC and CNC 138.

Figure 5:
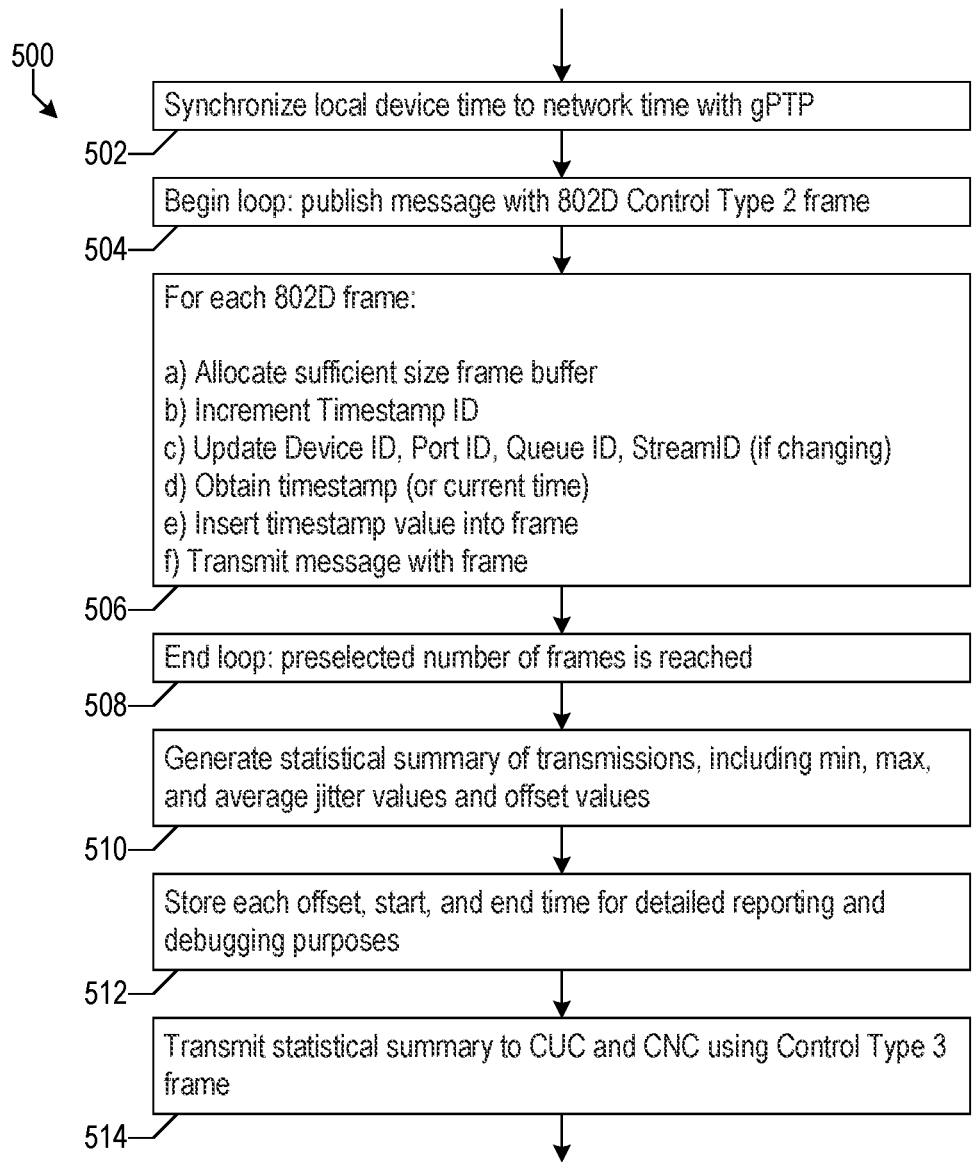
FIG. 5 illustrates an exemplary method for inserting time information at a client/talker end station in accordance with some embodiments of this disclosure.

Referring to FIG. 5, an exemplary method 500 is shown in the form of a flowchart for capturing time information at a client/talker end station 102 (i.e., end station 102 operating as a client/talker). The method generally begins at 502, where the client/talker end station 102 synchronizes its current local device time with the current network time, as set by the grandmaster clock 140 for the network 100. This can be performed by synchronizing the local (CPU) clock 148 to the network clock 144 via the grandmaster switch 142 in the manner prescribed by gPTP.

At 504, the client/talker end station 102 performs a loop that publishes/transmits a message at a certain time interval (p), for example, every 1 ms (i.e., p=1 ms). The loop is preferably configurable for a preselected number of intervals and should be precise and accurate to within nanoseconds, starting at the network epoch plus a preselected number of seconds. The preselected number of intervals may vary from implementation to implementation and depends on the particular constraints of the implementation. Within the loop, the client/talker end station 102 generates an 802D Control Type 2 frame at Layer 2 (TCL F) for each message.

At 506, for each 802D frame generated, the client/talker end station 102 allocates a sufficient size frame buffer to a variable-length frame to hold the expected number of timestamps along a given path through the network 100. The client/talker end station 102 then increments the Timestamp ID and also updates the Device ID, Port ID, Queue ID, and Stream ID if any of the data in any of those fields are changing. The first interval Timestamp ID should have a value of 0, and the last interval Timestamp ID should have a value of −1 (to indicate it is the last one in the sequence). The client/talker end station 102 then obtains a timestamp or some other indicator of the current time and inserts the timestamp value into the frame. The message containing the frame with the inserted timestamp is then transmitted.

The client/talker end station 102 repeats the process in 506 until a preselected number of frames has been reached (i.e., preselected number of intervals has elapsed), at which point the loop ends at 508. At 510, the client/talker end station 102 computes a statistical summary of certain network metrics from the timestamps that were transmitted at 506, including the minimum, maximum, and average jitter values and the minimum, maximum, and average gPTP offset values. At 512, the client/talker end station 102 optionally stores each offset, start, and end time for detailed reporting and debugging purposes. At 514, the client/talker end station 102 transmits the statistical summary to the CUC and CNC 138 using a message with a 802D Control Type 3 frame and its defined structure.

Figure 6:
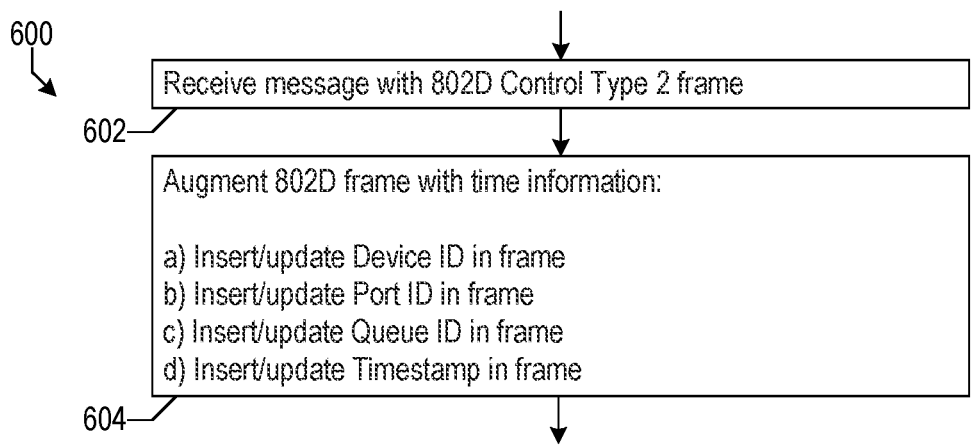
FIG. 6 illustrates an exemplary method for inserting time information at an infrastructure device in accordance with some embodiments of this disclosure.

FIG. 6 shows an exemplary method 600 in the form of a flowchart for capturing time information at a bridge 104 or other network infrastructure devices. The method generally begins at 602, where the bridge 104 receives a message with an 802D Control Type 2 frame. At 604, the bridge augments the 802D frame with the current time information at certain points as the 802D frame travels through the bridge 104. This can include but is not limited to inserting/updating the Device ID in the frame, inserting/updating the Port ID the frame, inserting/updating the Queue ID in the frame, and inserting/updating the timestamp in the frame.

The inclusion of the timestamp (or current timing information) may be based on the configuration of the bridge. For example, the bridge 104 can be configured to insert a timestamp at the ingress of the bridge and, optionally, the byte/bit at which the timestamp is taken upon reception in the frame. The bridge 104 can also be configured to insert a timestamp at the egress of the bridge and, optionally, the byte/bit at which timestamp is taken upon reception in the frame. The timestamp inclusion may be configurable options so that the options are independent of one another. This may help reduce the number of timestamps required to be obtained through verified network segments.

The insertion of the timestamp in the frame can be done at a preconfigured offset location from the start of the frame, which would require less processing (hence, faster). Alternatively, the location for insertion of the timestamp can be selected automatically by the bridge 104 based on the location of the immediately previous timestamp in the frame, which would require more processing (hence, slower).

Figure 7:
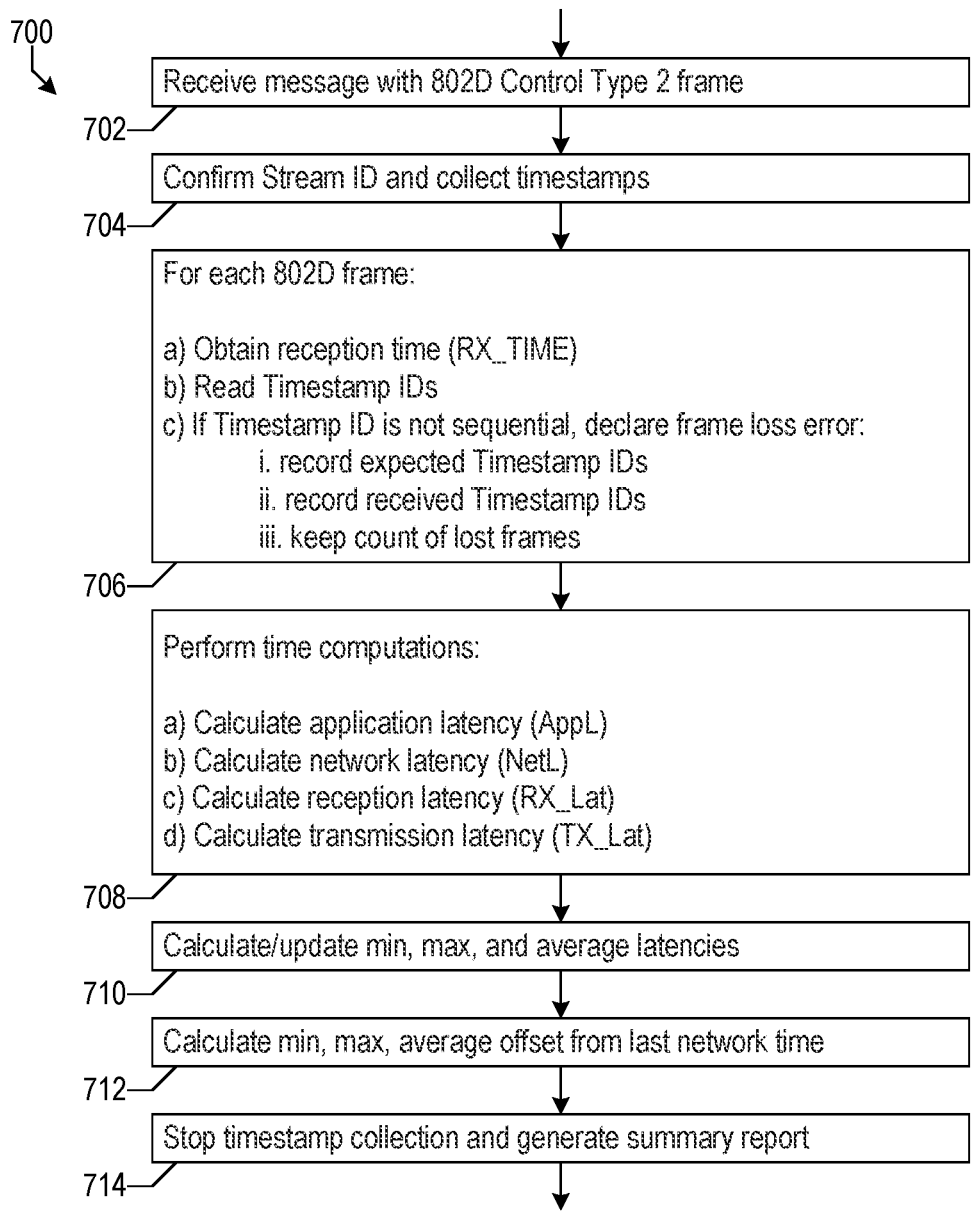
FIG. 7 illustrates an exemplary method for inserting time information at a server/listener end station in accordance with some embodiments of this disclosure.

FIG. 7 shows an exemplary method 700 in the form of a flowchart for collecting time information at a server/listener end station 102 (i.e., end station 102 operating as a server/listener). The method generally begins at 702, where the server/listener end station 102 receives a message with an 802D Control Type 2 frame. At 704, the server/listener end station 102 confirms that the Stream ID in the frame matches an expected Stream ID, then checks whether the Timestamp ID is 0. If the Timestamp ID is 0, then the server/listener end station 102 starts a new collection of timestamps (or current time information), else the server/listener end station 102 adds the timestamps to the existing collection.

At 706, the server/listener end station 102 checks and obtains the reception time (RX_TIME) for each frame that was received and reads the Timestamp ID in the frame. If Timestamp ID is out of sequence with the previous Timestamp ID, then the server/listener end station 102 declares a frame loss error, as discussed further below. Otherwise, the server/listener end station 102 proceeds to 708.

At 708, the server/listener end station 102 computes several latency related metrics from the message reception times and the timestamps in the frames of the received messages. For example, the server/listener end station 102 may compute the total application latency (AppL) with respect to the timestamp (TX_TIME) from the client/talker end station 102 (i.e., AppL=RX_TIME−TX_TIME). The server/listener end station 102 may also compute the network latency (NetL) by examining and adding timestamps inserted by various bridges 104 and other network infrastructure devices (i.e., NetL=RX_TIME−bridge timestamps). The server/listener end station 102 may further compute the reception latency (RX_Lat) from the reception time and the timestamp in the last bridge before the message was received (i.e., RX_Lat=RX_TIME–last bridge time stamp). The server/listener end station 102 may still further compute the transmission latency (TX_Lat) from the client/talker timestamp (TX_TIME) and the first bridge timestamp (i.e., TX_Lat=first bridge timestamp–TX_TIME).

At 710, the server/listener end station 102 calculates and updates the minimum, maximum, and average for the latency related network metrics from the collected timestamps. At 712, the server/listener end station 102 calculates and updates the minimum, maximum, and average gPTP offset from the collected timestamps. At 714, the server/listener end station 102 stops timestamp collection and generates a summary report of the metrics once the last message containing the 802D Control Type 2 frame in the stream has been received.

Figure 8A:
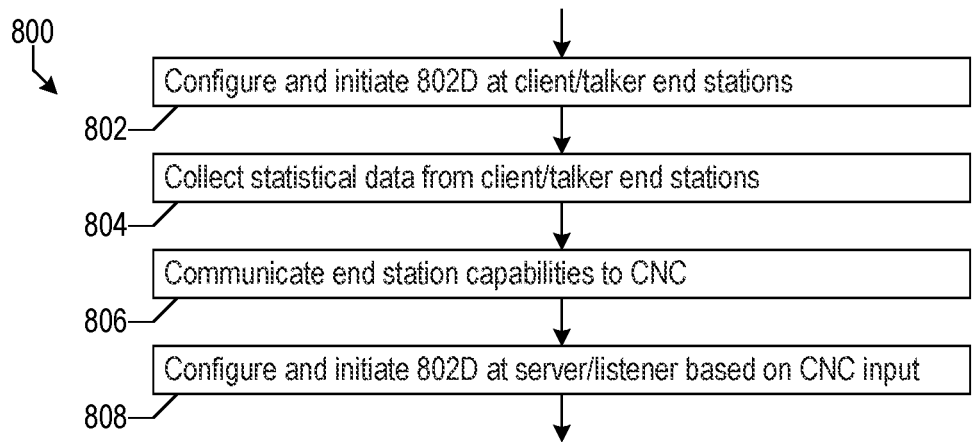
FIGS. 8A and 8B illustrate exemplary methods for collecting time information at a CUC and CNC in accordance with some embodiments of this disclosure.
Figure 8B:
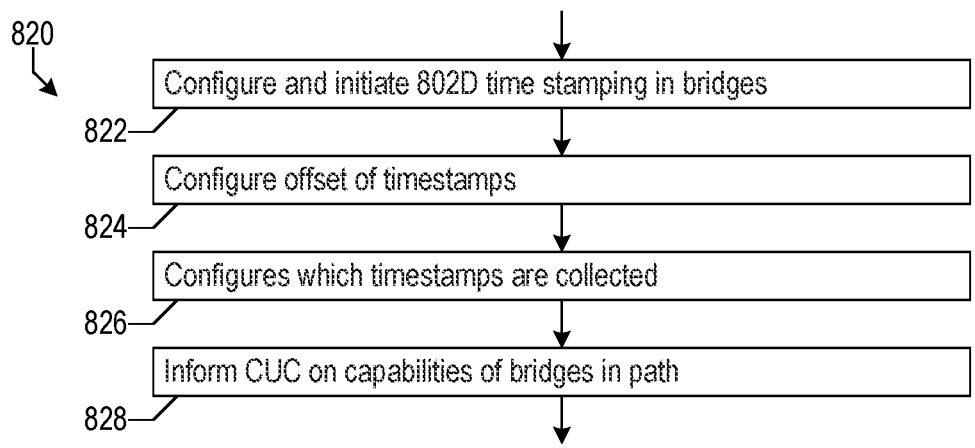

FIGS. 8A and 8B show exemplary methods that may be used by the CUC and CNC 138 to configure the devices in the network 100 to monitor and verify message transit times along a given path in the network 100. Each of the CUC and CNC 138, whether directly or indirectly, is connected to and can access all devices on the network 100 (at least in a centralized implementation of the CUC and CNC). In particular, the CUC is connected to and can access all end stations 102 and the CNC is connected to and can access all bridges 104 (and other network infrastructure devices) on the network 100. This allows the CUC and CNC 138 to configure and enable direct monitoring of latencies in network devices at Layer 2 (i.e., via time stamping at TCL F) on demand in the devices on the network 100.

FIG. 8A shows an exemplary method 800 that may be used at the CUC to configure and enable direct monitoring of latencies in network devices. The method generally begins at 802 where the CUC configures the end stations 102 by sending an appropriate command or instruction to initiate 802D time stamping at the end stations 102 operating as client/talker devices. For example, many industrial networks today are managed and monitored using information technology (IT) tools and protocols that employ NETCONF/YANG and SNMP/MIB. The CUC could issue a command or instruction to the end stations 102 according to one of these management protocols, or a customer specific protocol such as OPCUA, or a command or instruction specifically set up for the purpose in the 802D protocol. Other ways for the CUC to configure the end station 102 to initiate 802D time stamping are also within the scope of the disclosed embodiments. At 804, the CUC determines the capabilities of the client/talker end stations 102 by collecting statistical data from the client/talker end stations 102 about response time, jitter, offset, and the like. At 806, the CUC communicates the capabilities of the client/talker end stations 102 to the CNC for analysis.

Thereafter at 808, based on input from the CNC (e.g., number of bridges 104 or other network infrastructure devices for a given path in the network), the CUC configures the end stations 102 operating as server/listener devices to initiate 802D timestamp collection. Again, this can be done by the CUC issuing an appropriate command or instruction to the server/listener end stations 102 (e.g., by writing to an exposed 802D interface using NETCONF, SNMP, OPCUA, etc.) as discussed above. In some implementations, configuring and initiating 802D on server/listener end stations 102 based on CNC input of the number of bridges may be avoided by using timestamp markers in the 802D frame.

FIG. 8B shows an exemplary method 820 that may be used at the CNC to configure and enable direct monitoring of latencies in network devices. The method generally begins at 822 where the CNC configures the bridges 104 by issuing an appropriate command or instruction to the bridges 104 in a similar manner as discussed above for the CUC to initiate 802D time stamping at the bridges 104. As with the CUC, other ways for the CNC to configure the bridges 104 to initiate 802D time stamping are also within the scope of the disclosed embodiments. At 824, the CNC configures the offset to be used with the timestamps in the bridges 104 by sending an appropriate command. At 826, the CNC configures which timestamps are to be collected at the bridges 104 (e.g., at the ingress (TCL G), at the egress (TCL H), or both). At 828, the CNC form of the CUC on the capabilities of the bridges 104 in the given path.

The methods described above relate to the use of Layer 2 (L2) direct timestamp capture in which a timestamp is obtained and appended to a message at various preselected TCLs as the message traverses a path along the network 100. As briefly discussed earlier, embodiments of the 802D time capture location protocol contemplate a second method that uses centralized time capture where latency is derived from existing time information received at the CUC and CNC 138 from the end stations 102. Centralized time capture is similar to L2 direct stamping except with some additional capabilities.

The centralized time capture approach has two types of operations: operations where time information is attached to the pattern of the existing TSN stream, and operations that generate 802D frames. The main operational difference between the centralized approach and the direct approach is that the centralized mode of time capture does not insert a timestamp into the stream or anywhere else in the 802D time capture location protocol. The steps that insert timestamps into the frames are substituted with the steps of recording and communicating time data to the CUC and CNC using 802D Control Type 4 messages. In the centralized approach, the CUC and CNC serve as a stream collection processor and analytics engine. As such, the CUC and CNC have enough information to compare the configured/expected latency to latency obtained from 802D time information for each stream in the network. This allows the CUC and CNC to calculate and correct bandwidth utilization, propose latency optimization, and even reconfigure paths through the network.

Consider the example of a client/talker T that transmits information to a server/listener L across a bridge B. The CNC has provisioned a gate through the bridge B that is open at a specific gPTP offset and for a specific duration. In an ideal situation, talkers and listeners would have constant and known transmission and reception delays, and bridges and network medium would have predictable latencies as well. In the real world, however, talkers and listeners often encounter delays due to network congestion, jitter, latency, and the like.

Consider further that client/talker T transmits at an offset of 200 µs from 0 and size of the frame is 1500 bytes, leading to a gate length of roughly 12 µs. Bridge B has latency of 3 µs and server/listener L has reception latency of 1 µs. The expected time of frame arrival would be at an offset of 216 µs from 0. Suppose that also this is a cyclic operation that occurs in 1 ms intervals. All of the device T, L, and B have time synchronized to nanosecond precision.

Several things can go wrong. First, client/talker T transmits a frame a few microseconds later than the configured 200 µs. Consequently, the frame arrives at bridge B late to fit in the 12 μs window, thereby delaying it for the entire cycle of 1 ms. Second, the gPTP time synchronization may have slightly larger jitter than expected and as a result, frames from client/talker T miss the window and frames are again delayed for another cycle. There may be many other issues as well.

These "misconfigurations" or highly optimized theoretical configurations can be avoided by use of the 802D protocol to check and conduct configuration evaluation. Since the protocol performs time stamping at each point in the network in some embodiments, it is possible to determine what is the maximum offset when client/talker T transmits data, then adjust the starting offset of the gate to +/−the error of 2 μs (assuming the maximum jitter of the application). The gate starting offset could be adjusted to 202 μs or its length could be adjusted to 14 μs to cover the transmission jitter, or both adjustments could be made to cover even for gPTP offset variations. This information could be reported to users and correction could be made either automatically or based on user confirmation of the change.

It is possible that some TSN devices including end stations and bridges exhibit deterioration over time. This may happen, for example, due to memory fragmentation, changes in the system, multiple reconfigurations, enabling and/or disabling of additional TSN features, human interference with the system, and the like. The 802D protocol herein can be used as a quality assurance tool by the CNC to verify that the overall system is still performing according to the original configurations. Following now are methods that may be used to implement the centralized time capture approach.

Figure 9:
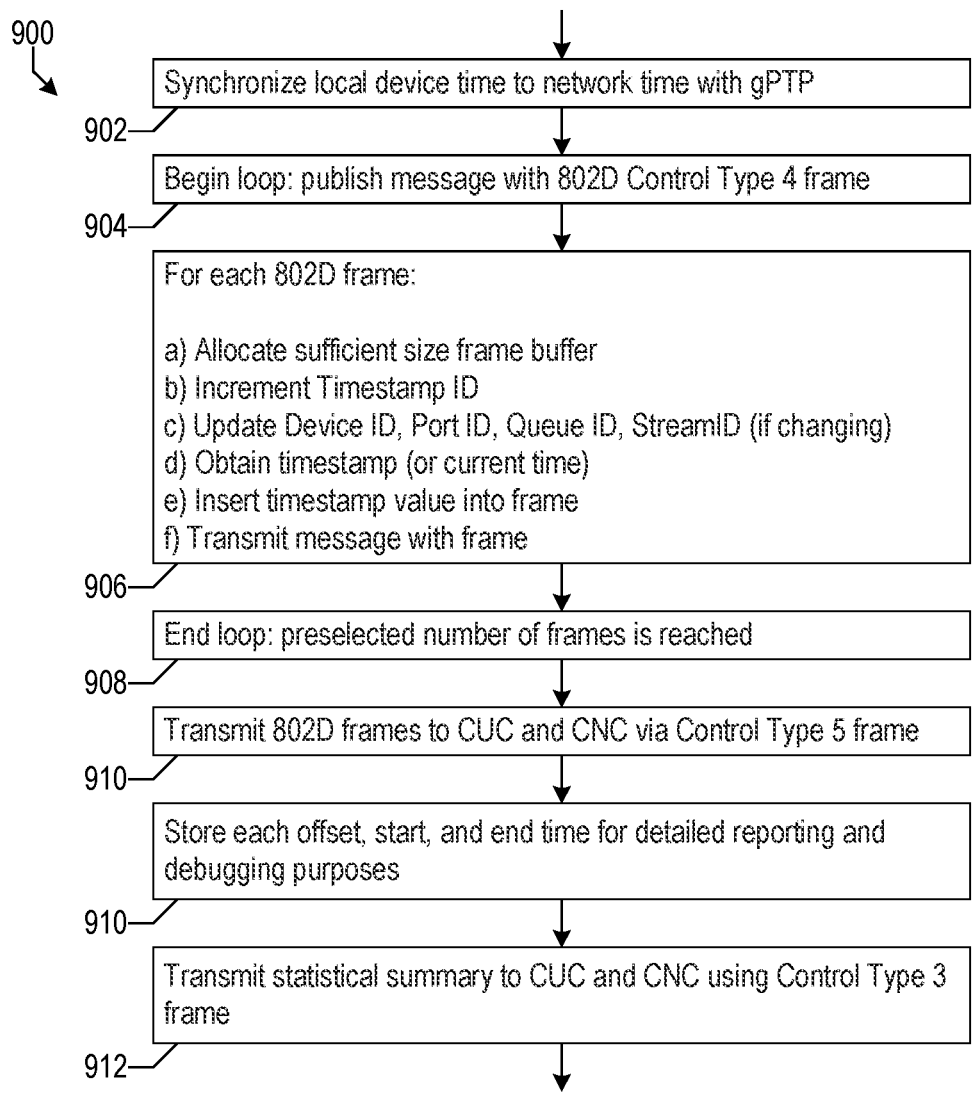
FIG. 9 illustrates another exemplary method for inserting time information at a client/talker end station in accordance with some embodiments of this disclosure.

Referring to FIG. 9, an exemplary method 900 is shown for implementing centralized time information capture at a client/talker end station 102 (i.e., end station 102 operating as a client/talker). The method 900 is similar to its counterpart from FIG. 5, except time information is transmitted from the client/talker end station 102 directly to the CUC and CNC 138 for processing. The method generally begins at 902, where the client/talker end station 102 synchronizes its current local device time with the current network time, as set by the grandmaster clock 140 for the network 100. Again, this can be performed by synchronizing the local (CPU) clock 148 to the network clock 144 via the grandmaster switch 142 in the manner prescribed by gPTP.

At 904, the client/talker end station 102 performs a loop that publishes/transmits a message at a certain time interval (p), for example, every 1 ms (i.e., p=1 ms). The loop is preferably configurable for a preselected number of intervals and should be precise and accurate to within nanoseconds, starting at the network epoch plus a preselected number of seconds. Within the loop, the client/talker end station 102 generates an 802D Control Type 4 (instead of Control Type 2) frame at Layer 2 (TCL F) for each message.

At 906, for each 802D frame generated, the client/talker end station 102 allocates a sufficient size frame buffer to the variable-length frame to hold the expected number of timestamps along a given path through the network 100. The client/talker end station 102 then increments the Timestamp ID and also updates the Device ID, Port ID, Queue ID, and Stream ID if any of the data in any of those fields are changing. The first Timestamp ID should have a value of 0, and the last Timestamp ID should have a value of −1 (again, to indicate it is the last one in the sequence). The client/talker end station 102 then obtains a timestamp or some other indicator of the current time and inserts the timestamp value into the frame. The message containing the frame with the inserted timestamp is then transmitted directly to the CUC instead of to the next bridge or switch in the provisioned path, as would be the case for Control Type 2 frames (see FIG. 5).

The client/talker end station 102 repeats the process in 906 until a preselected number of frames has been reached (i.e., preselected number of intervals has elapsed), at which point the loop ends at 908. At 910, the client/talker end station 102 transmits the 802D frames to the CUC and CNC 138 using a message having a 802D Control Type 5 Frame. At 912, the client/talker end station 102 optionally stores each offset, start, and end time for detailed reporting and debugging purposes. At 914, the client/talker end station 102 transmits a statistical summary to the CUC and CNC 138 using a message with a 802D Control Type 3 frame and its defined structure.

Figure 10:
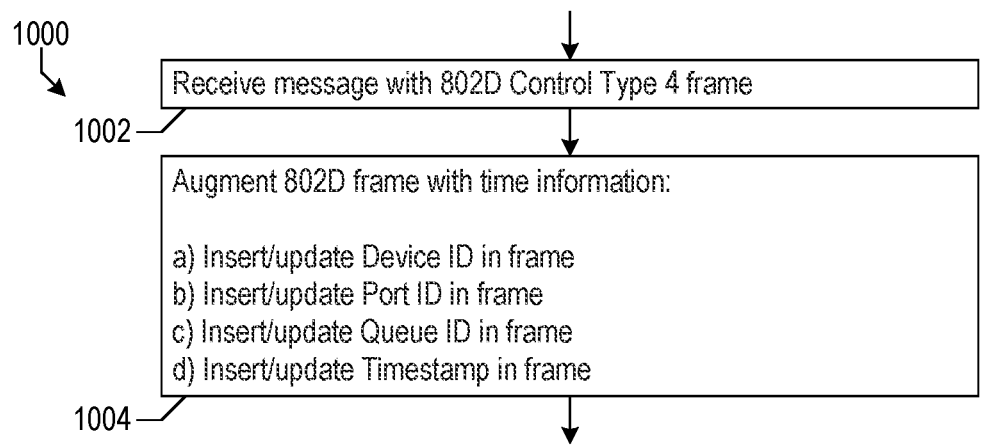
FIG. 10 illustrates another exemplary method for inserting time information at an infrastructure device in accordance with some embodiments of this disclosure.

FIG. 10 shows an exemplary method 1000 in the form of a flowchart for capturing time information at a bridge 104 or other network infrastructure devices. The method 1000 is similar to its counterpart from FIG. 6. The method generally begins at 1002, where the bridge 104 receives a message with an 802D Control Type 2 frame. At 1004, the bridge augments the 802D frame with the current time information at certain points as the 802D frame travels through the bridge 104. This can include but is not limited to inserting/updating the Device ID in the frame, inserting/updating the Port ID the frame, inserting/updating the Queue ID in the frame, and inserting/updating the timestamp in the frame.

The inclusion of the timestamp (or current timing information) may be based on the configuration of the bridge. For example, the bridge 104 can be configured to insert a timestamp at the ingress of the bridge and, optionally, the byte/bit at which the timestamp is taken upon reception in the frame. The bridge 104 can also be configured to insert a timestamp at the egress of the bridge and, optionally, the byte/bit at which timestamp is taken upon reception in the frame. The timestamp inclusion may be configurable options so that the options are independent of one another. This may help reduce the number of timestamps required to be obtained through verified network segments.

The insertion of the timestamp in the frame can be done at a preconfigured offset location from the start of the frame, which would require less processing (hence, faster). Alternatively, the location for insertion of the timestamp can be selected automatically by the bridge 104 based on the location of the immediately previous timestamp in the frame, which would require more processing (hence, slower). In some embodiments, the frames may have a predefined pattern filled slots into which information can be inserted. For example, the frame payload can have a preconfigured pattern, such as 005555005555005555, where the 0's (or 0000 in binary) and 5's (or 0101 in binary) represent a pattern or placeholder known to the bridge or switch where the timestamp could be inserted. The bridge or switch could then automatically detect a first sub-pattern, such as 5555, and overwrite a preselected number of bytes (e.g., 4 bytes) therein with the timestamp, then detect the next instance of the sub-pattern and overwrite a preselected number of bytes therein with the timestamp, and so on.

gPTP Offset Reporting

Figure 11:
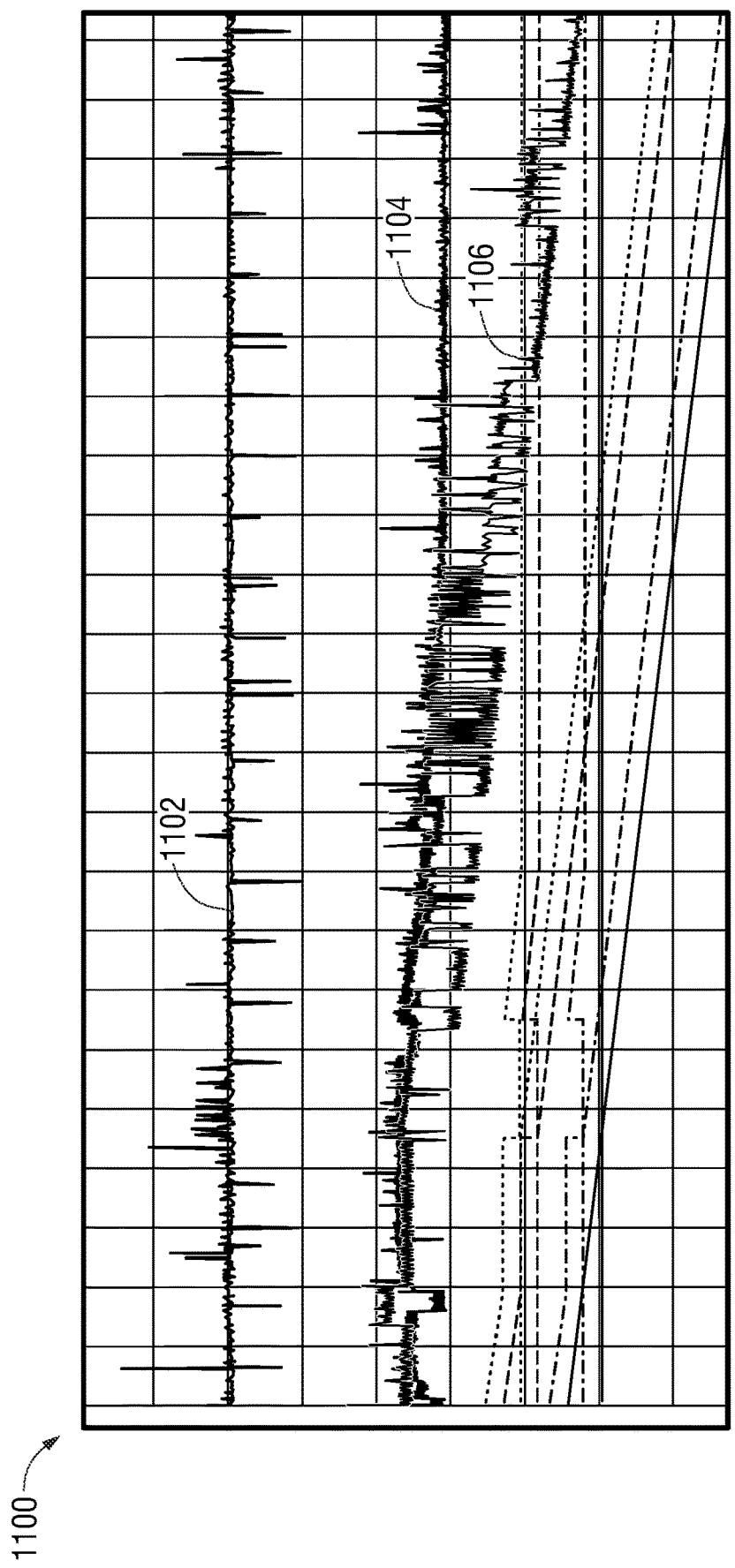
FIG. 11 illustrates exemplary clock draft due to network latency in accordance with some embodiments of this disclosure.

Referring now to FIG. 11, a graph 1100 containing several clock traces are shown that illustrate possible clock drifts in a TSN-configured network like the network 100. As mentioned above, time in the network 100 is set by a centralized gPTP grandmaster clock 140. Network devices synchronize their working clocks 144 with the grandmaster clock 140 via a gPTP grandmaster switch 142 that relays messages containing the current time from the grandmaster clock 140. While the generalized gPTP protocol can maintain time in the network 100 with extremely high precision, clock drifts can still occur over time due to the distributive nature of gPTP. This is depicted in FIG. 11 where the trace labeled 1102 represents the gPTP grandmaster clock 140 and the trace labeled 1104 represents the working clocks 144. As can be seen, the working clocks 144 normally stay within a known and acceptable offset value (e.g., 10 ns) from the gPTP grandmaster clock 140. However, the working clocks 144 can deviate beyond the known and acceptable offset when clock drift occurs. This is demonstrated by the trace labeled 1106, which represents the working clocks 144 when clock drifts occur.

The 802D time capture location protocol herein can facilitate detection of clock drifts in the network 100. For example, each end station 102 and bridge 104 (or other network infrastructure device) in the TSN-configured network 100 can report latencies and other problems to the CUC and CNC 138 via messages with the timestamped frames discussed herein. This information can serve as precision assurance for each device on the network and may also be used to explain the latencies detected using the 802D protocol. For example, it is possible for the CUC or CNC to deduce that drift has occurred by monitoring a TCL or several TCLs over time and tracking the minimum, maximum, and difference. Once drift has been detected using the 802D protocol, the CUC or CNC can use the diagnostic features of gPTP to verify whether the cause of the latencies is the PTP drift. In some embodiments, an automated process may be used to correct the latencies acquired by the 802D protocol. The messages may be communicated using Control Type 1 frames according to the 802D protocol (see Table 1). These messages may contain the Masterclock ID, Client/Talker ID, Clock ID, and the amount of offset from the masterclock, among other things. The messages may be sent at a suitable preselected time interval.

TAS Error Reporting

In addition to clock precision assurance, the 802D protocol can also be used to detect early and late arriving frames. In a TSN-configured network, a Time-Aware Shaper (TAS) in each end station client/talker and bridge constrains transmissions of messages on the network to a number of channels, which are essentially windows of time during which transmission may take place. Some of these channels are reserved for high-priority messages, which guarantees that the messages will be delivered with no more than a preselected maximum amount of latency. Each end station client/talker and bridge (or other network infrastructure device) that can configure channels also has the ability to detect early and late arriving frames (i.e., frames that arrive before the window opens or after the TAS window closes).

With the 802D protocol, detection of early and late arriving frames can be made an explicit function. Since the 802D protocol uses frames that are timestamped at the ingress of the device (TCL G), the time when the frame should arrive at the egress (TCL H) is therefore known in advance. If the frame is received earlier or later than expected at the egress, then the end station client/talker and bridge can generate and transmit an 802D error message to the CUC and CNC indicating a potential device misconfiguration or presence of high traffic jitter. The same detection can also apply to frames that are larger than the size of the TAS window. Exemplary error codes and their descriptions are provided in Table 2 below. Additional and/or alternative codes are within the scope of the present disclosure.

TABLE 2

802D Error Codes

| Error Code | Description |
|---|---|
| 1 | Early frames |
| 2 | Late frames |
| 3 | Oversized frames |
| 4 | Dropped frame queue overload |

In addition to the end stations 102 and switches, bridges, and relays 104 discussed above, embodiments of the present disclosure further contemplate using an Ethernet test access point (TAP), also called an intelligent TAP device, as an TCL where timestamps may be inserted. Intelligent TAP devices are independently configurable devices that can be inserted an various points in a network to copy network traffic flowing between two nodes in the network. The intelligent TAP devices then provide the copied traffic to network tools, such as security and analysis tools, to provide an assessment of the performance of the network.

Figure 12:
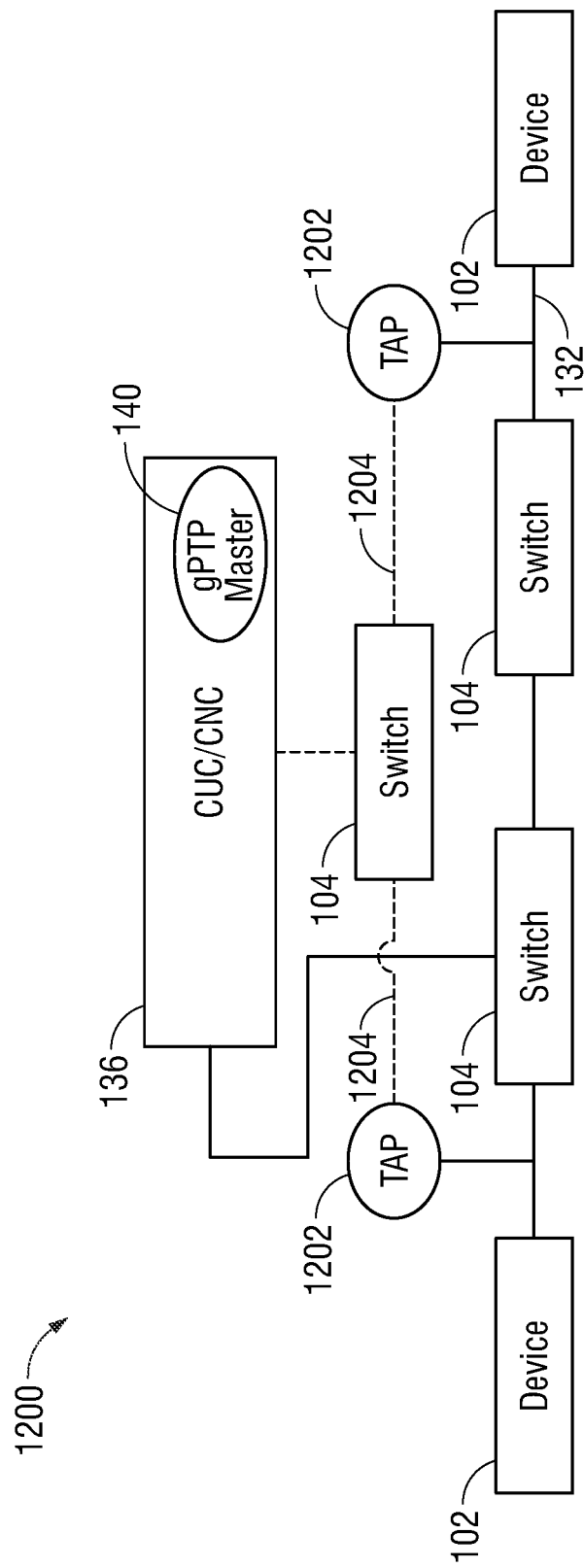
FIG. 12 illustrates exemplary time capture locations at intelligent TAP devices in accordance with some embodiments of this disclosure.

FIG. 12 shows an exemplary TSN-configured network 1200 in which one or more TAP devices may be used as a TCL where timestamps may be inserted in accordance with embodiments of the present disclosure. The network 1200 is similar to the TSN-configured network 100 discussed previously in that there are TSN end stations 102 connected to TSN bridges, switches, and relays 104 over a physical medium 132. A network control application 138, which may be a CUC/CNC in some embodiments, is also present in the network 1200. To maintain time-awareness, the various end stations 102 and bridges, switches, and relays 104 in the network 1200 are synchronized to a gPTP grandmaster clock 140 that establishes the current network time for the network 1200. The grandmaster clock 140 can be implemented as part of the CUC/CNC 138 in some embodiments, or it can it can be implemented one hop away from the CUC and CNC 138 in some embodiments, or it can be implemented in some other suitable arrangement.

In accordance with embodiments of the present disclosure, the network 1200 also includes several intelligent TAP devices 1202 that are added at various points within the network 1200. These intelligent TAP devices 1202 can be located anywhere on the network 1200 between one or more end stations 102 and one or more switches 104 to act as a passive frame capture device. The TAP devices 1202 are synchronized to and receive time information from the gPTP grandmaster clock 140 in the usual manner, and thus are time-aware and have access to precise network time.

In general operation, the TAP devices 1202 can be configured on demand by the CUC/CNC 136 to initiate time capture in a similar manner to the end stations 102 and the switches 104. Once configured, the TAP devices 1202 obtain and insert time information (e.g., timestamps) into the copied frames and provide the frames to the CUC/CNC 136 as out-of-band messages via 802D Control Type 4 frames. In some embodiments, the out-of-band messages containing the Control Type 4 frames are sent to the CUC/CNC 136 using a supplemental backend network, indicated by dashed lines 1204, to which the TAP devices 1202 are connected. The use of the 802D protocol and the intelligent TAP devices 1202 in this way minimizes or avoids the need to configure the end stations 102 and/or the switches 104 to obtain and provide timestamps, thereby limiting intrusion on network configuration. It is of course possible for the network 1200 to include configured TAP devices 1202 as well as configured end stations 102 and/or configured switches 104 within the scope of the disclosed embodiments.

In addition to supporting the 802D protocol, the intelligent TAP devices 1202 can also be configured (by the CUC/CNC 136) to provide a probe and capture mechanism that uses pattern recognition to capture frames with certain preselected characteristics. When a frame with the preselected characteristics is detected by a TAP device 1202, that TAP device 1202 generates an out-of-band message using an 802D Control Type 4 frame and sends the frame (with the timestamps inserted therein) to the CUC/CNC 136. When another TAP device 1202 detects the same frame, that TAP device 1202 also captures and sends the frame (with the timestamps inserted therein) to the CUC/CNC 136. At the CUC/CNC 136, the frames from the out-of-band 802D messages are merged and the time information analyzed for jitter, latencies, and delays in the manner described previously.

Figure 13:
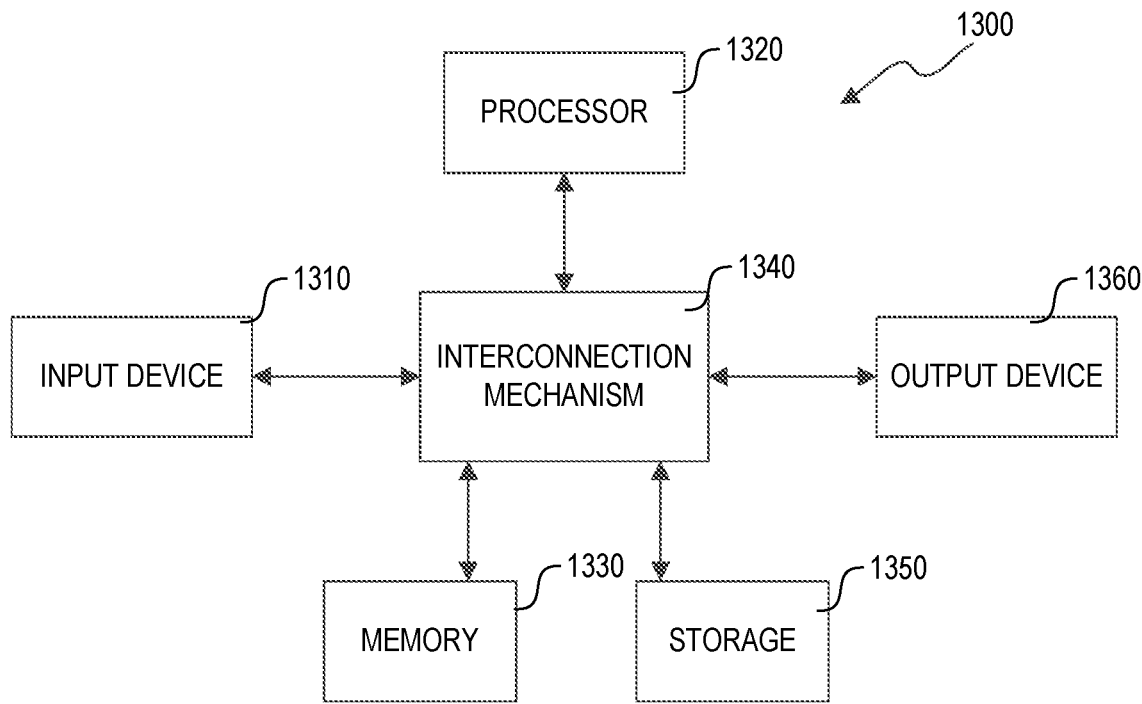
FIG. 13 illustrates an exemplary general-purpose computing system that may be used to implement various embodiments of this disclosure.

FIG. 13 illustrates an exemplary computing system that may be used to implement various embodiments of this disclosure. In general, any general-purpose computing systems used in various embodiments of this disclosure may be used. Such computing systems may be either physical or virtual. For example, various embodiments of the disclosure may be implemented as specialized software executing in a general-purpose computing system 1300 such as that shown in FIG. 13. The computing system 1300 may include a processor 1320 connected to one or more memory devices 1330, such as a disk drive, memory, or other device for storing data. Memory 1330 is typically used for storing programs and data during operation of the computing system 1300. The computing system 1300 may also include a storage system 1350 that provides additional storage capacity. Components of computing system 1300 may be coupled by an interconnection mechanism 1340, which may include one or more busses (e.g., between components that are integrated within the same machine) and/or a network (e.g., between components that reside on separate discrete machines). The interconnection mechanism 1340 enables communications (e.g., data, instructions) to be exchanged between system components of system 1300.

Computing system 1300 also includes one or more input devices 1310, for example, keypads, mouse, trackball, microphone, touch screen, and one or more output devices 1360, for example, a printing device, display screen, speaker. In addition, computing system 1300 may contain one or more interfaces (not shown) that connect computing system 1300 to a communication network (in addition or as an alternative to the interconnection mechanism 1340).

Figure 14:
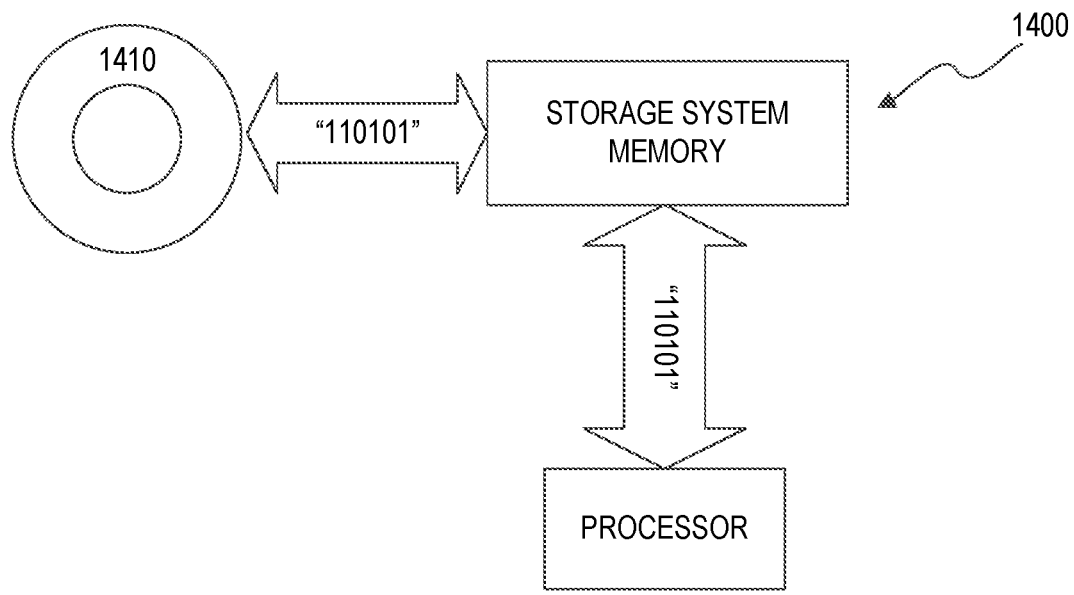
FIG. 14 illustrates an exemplary general-purpose storage system that may be used to implement various embodiments of this disclosure.

The storage system 1350, shown in greater detail in FIG. 14, typically includes a computing readable and writeable nonvolatile recording medium 1410 in which signals are stored that define a program to be executed by the processor 1320 or information stored on or in the medium 1410 to be processed by the program to perform one or more functions associated with embodiments described herein. The medium may, for example, be a disk or flash memory. Typically, in operation, the processor 1320 causes data to be read from the nonvolatile recording medium 1410 into storage system memory 1420 that allows for faster access to the information by the processor than does the medium 1410. This storage system memory 1420 is typically a volatile, random access memory such as a dynamic random-access memory (DRAM) or static memory (SRAM). This storage system memory 1420 may be located in storage system 1350, as shown, or in the system memory 1330. The processor 1320 generally manipulates the data within the memory system 1420 and then copies the data to the medium 1410 after processing is completed. A variety of mechanisms are known for managing data movement between the medium 1410 and the integrated circuit memory element 1420, and the disclosure is not limited thereto. The disclosure is not limited to a particular memory 1420, memory 1330 or storage system 1350.

The computing system may include specially programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computing system described above or as an independent component.

Although computing system 1300 is shown by way of example as one type of computing system upon which various aspects of the disclosure may be practiced, it should be appreciated that aspects of the disclosure are not limited to being implemented on the computing system as shown in FIG. 13. Various aspects of the disclosure may be practiced on one or more computing systems having a different architecture or components shown in FIG. 13. Further, where functions or processes of embodiments of the disclosure are described herein (or in the claims) as being performed on a processor or controller, such description is intended to include systems that use more than one processor or controller to perform the functions.

Computing system 1300 may be a general-purpose computing system that is programmable using a high-level computing programming language. Computing system 1300 may be also implemented using specially programmed, special purpose hardware. In computing system 1300, processor 1320 is typically a commercially available processor such as the well-known Pentium class processor available from the Intel Corporation. Many other processors are available. Such a processor usually executes an operating system.

The processor and operating system together define a computing platform for which application programs in high-level programming languages are written. It should be understood that embodiments of the disclosure are not limited to a particular computing system platform, processor, operating system, or network. Also, it should be apparent to those skilled in the art that the present disclosure is not limited to a specific programming language or computing system. Further, it should be appreciated that other appropriate programming languages and other appropriate computing systems could also be used.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It will be appreciated that the development of an actual commercial application incorporating aspects of the disclosed embodiments will require many implementation specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

The various embodiments disclosed herein may be implemented as a system, method or computing program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computing program product embodied in one or more computing-readable medium(s) having computing-readable program code embodied thereon.

Any combination of one or more computing-readable medium(s) may be utilized. The computing-readable medium may be a non-transitory computing-readable medium. A non-transitory computing-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computing-readable medium can include the following: an electrical connection having one or more wires, a portable computing diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computing-readable medium may be transmitted using any appropriate medium, including but not limited to wireless, wireline, optical fiber cable, RF, etc., or any suitable combination of the foregoing.

Computing program code for carrying out operations for aspects of the present disclosure may be written in any combination of one or more programming languages. Moreover, such computing program code can execute using a single computing system or by multiple computing systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computing logic (e.g., computing program instructions, hardware logic, a combination of the two, etc.). Generally, computing program instructions may be provided to a processor(s) of a general-purpose computing, special-purpose computing, or other programmable data processing apparatus. Moreover, the execution of such computing program instructions using the processor(s) produces a machine that can carry out a function(s) or act(s) specified in the flowchart and/or block diagram block or blocks.

One or more portions of the computing system may be distributed across one or more computing systems coupled to a communications network. For example, as discussed above, a computing system that determines available power capacity may be located remotely from a system manager. These computing systems also may be general-purpose computing systems. For example, various aspects of the disclosure may be distributed among one or more computing systems configured to provide a service (e.g., servers) to one or more client computing systems, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, Fortran, Cobol, TCL, or Lua. Various aspects of the disclosure may be implemented in a non-programmed environment (e.g., analytics platforms, or documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computing instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system for monitoring a network configured for Time-Sensitive Networking (TSN), the system comprising:
   an end station configured to transmit and receive TSN messages;
   a Centralized User Configurator (CUC) configured to connect to the end station, the CUC further configured to instruct the end station to initiate time data capture;
   wherein the end station is further configured to generate, in response to being instructed by the CUC to initiate time data capture, a predetermined number of frames at a preselected interconnection layer and transmit the frames to the CUC, the end station further configured to insert current network time data in each frame; and
   wherein the CUC is further configured to determine how much jitter and/or latency is present using the current network time data in the frames.

2. The system of claim 1, wherein the preselected interconnection layer is Layer 2 of the Open Systems Interconnection (OSI) model.

3. The system of claim 1, wherein the current network time data in each frame is a timestamp, each timestamp reflecting then-current network time.

4. The system of claim 3, further comprising a network infrastructure device configured to connect to the end station, wherein the end station transmits the frames to the CUC by first transmitting the frames to the network infrastructure device.

5. The system of claim 4, further comprising a Centralized Network Controller (CNC) configured to connect to the CUC and the network infrastructure device, the CNC further configured to instruct the network infrastructure device to initiate time stamping of frames received at the network infrastructure device.

6. The system of claim 5, wherein the network infrastructure device is further configured to insert, in response to being instructed by the CNC to initiate time stamping, a timestamp reflecting current network time in each frame received at the network infrastructure device, the timestamp being inserted in a preselected sub-pattern of a preconfigured pattern within the frame.

7. The system of claim 6, wherein the end station is a client/talker end station, further comprising a server/listener end station configured to connect to the network infrastructure device and the CUC, the server/listener end station further configured to receive frames from the infrastructure device and, in response to being instructed by the CUC, collect the timestamps in the frames and calculate one or more of application latency, network latency, reception latency, and transmission latency using the timestamps.

8. A method of monitoring a network configured for Time-Sensitive Networking (TSN), the method comprising:
   providing a talker device configured to generate a frame with an initial timestamp at a preselected layer of the Open Systems Interconnection (OSI) model, the initial timestamp reflecting then-current network time, the talker device further configured to add additional timestamps to the frame as the frame traverses OSI model layers towards a network port of the talker device, each additional timestamp reflecting then-current network time;
   providing at least one infrastructure device configured to connect to the talker device, the talker device further configured to transmit the frame via the at least one infrastructure device, wherein at a preconfigured one of the at least one infrastructure device, the frame is timestamped at an ingress and an egress of the infrastructure device; and
   providing a listener device configured to receive the frame from the infrastructure device, the listener device configured to collect the at least one additional timestamp as the frame traverses the OSI model layers of the listener device, the at least one timestamp taken at a preselected OSI model layer of the listener device;
   wherein jitter and/or latency in the network is calculated based on the collected timestamps, including the initial timestamp and the at least one timestamp.

9. The method of claim 8, further comprising providing a Centralized User Configurator (CUC) and/or a Centralized Network Configurator (CNC), wherein the jitter and/or latency is calculated by the listener device and communicated to the CUC and/or the CNC.

10. The method of claim 8, further comprising providing a Centralized User Configurator (CUC) and/or a Centralized Network Configurator (CNC), wherein the jitter and/or latency is calculated by the CUC and/or the CNC using the collected timestamps.

11. The method of claim 8, wherein the jitter and/or latency includes at least one of: a transmission jitter of the talker device, latency across each infrastructure device, latency across an infrastructure segment comprising one or more infrastructure devices, or a reception jitter of the listener device.

12. The method of claim 11, wherein the listener device is one of a plurality of listener devices, and the jitter and/or latency includes offset from reception of the listener device and multi-stream jitter.

13. The method of claim 8, further comprising performing a comparison of the calculated latency to a configured latency of the network.

14. The method of claim 13, further comprising identifying a misconfiguration or a faulty device in TSN provisioned paths through the network based on the comparison.

15. The method of claim 13, further comprising, based on the comparison, calculating and correcting bandwidth utilization, proposing latency optimization, or reconfiguring paths through the network.

16. The method of claim 8, wherein the timestamps are inserted or appended to the frame in a preselected sub-pattern of a preconfigured pattern within the frame.

17. A non-transitory computer-readable medium storing computer-readable instructions that, when executed by a processor, cause the processor to:
   instruct an end station to initiate time data capture, the end station generating, in response to being instructed by the processor, a predetermined number of frames at a preselected interconnection layer and transmitting the frames to the processor, the end station inserting current network time data in each frame; and
   determine an amount of jitter and/or latency using the current network time data in the frames.

18. The non-transitory computer-readable medium of claim 17, wherein the computer-readable instructions, when executed by the processor, further cause the processor to instruct an infrastructure device to initiate time stamping of frames received at the infrastructure device.

19. The non-transitory computer-readable medium of claim 18, wherein the computer-readable instructions, when executed by the processor, further cause the processor to instruct the end station to transmit the frames to the processor by first transmitting the frames to the infrastructure device.

20. The non-transitory computer-readable medium of claim 17, wherein the computer-readable instructions, when executed by the processor, further cause the processor implement a Centralized User Configurator (CUC), a Centralized Network Processor (CNC), or both.

\* \* \* \* \*